(12) United States Patent
Russell et al.

(10) Patent No.: US 10,432,915 B2
(45) Date of Patent: Oct. 1, 2019

(54) SYSTEMS, METHODS, AND DEVICES FOR GENERATING THREE-DIMENSIONAL MODELS

(71) Applicant: The Sanborn Map Company, Inc., Colorado Springs, CO (US)

(72) Inventors: John David Russell, Williamsburg, VA (US); Sharad Vimal Oberoi, Colorado Springs, CO (US); John R. Copple, Golden, CO (US)

(73) Assignee: The Sanborn Map Company, Inc., Colorado Springs, CO (US)

( * ) Notice: Subject to any disclaimer, the term of this patent is extended or adjusted under 35 U.S.C. 154(b) by 253 days.

(21) Appl. No.: 15/466,700

(22) Filed: Mar. 22, 2017

(65) Prior Publication Data

US 2017/0278268 A1  Sep. 28, 2017

Related U.S. Application Data

(60) Provisional application No. 62/311,566, filed on Mar. 22, 2016.

(51) Int. Cl.
| | |
|---|---|
| *H04N 13/02* | (2006.01) |
| *H04N 5/33* | (2006.01) |
| *G06T 7/73* | (2017.01) |
| *H04N 13/282* | (2018.01) |
| *G06T 17/05* | (2011.01) |
| *G01B 11/14* | (2006.01) |
| *G06T 7/55* | (2017.01) |
| *G06T 7/579* | (2017.01) |

(52) U.S. Cl.
CPC ........... *H04N 13/282* (2018.05); *G01B 11/14* (2013.01); *G06T 7/55* (2017.01); *G06T 7/579* (2017.01); *G06T 17/05* (2013.01); *G06T 2207/10016* (2013.01); *G06T 2207/10032* (2013.01); *G06T 2207/10048* (2013.01); *G06T 2207/30184* (2013.01)

(58) Field of Classification Search
CPC .................. G01B 11/14; G06T 17/05; G06T 2207/10016; G06T 2207/10032; G06T 2207/10048; G06T 2207/30184; G06T 7/55; G06T 7/579; H04N 13/282
See application file for complete search history.

(56) References Cited

U.S. PATENT DOCUMENTS

| | | | | |
|---|---|---|---|---|
| 9,749,597 B2* | 8/2017 | Azulai | .................. | H04N 7/183 |
| 9,773,313 B1* | 9/2017 | Klingner | ................... | G06T 7/50 |
| 2008/0297795 A1* | 12/2008 | Yonggang | ............ | G01B 11/026 |
| | | | | 356/326 |
| 2015/0371431 A1* | 12/2015 | Korb | ......................... | G06T 9/00 |
| | | | | 382/113 |
| 2016/0127617 A1* | 5/2016 | Partouche | .............. | H04N 5/232 |
| | | | | 348/207.99 |

* cited by examiner

*Primary Examiner* — Md N Haque
(74) *Attorney, Agent, or Firm* — Brownstein Hyatt Farber Schreck, LLP

(57) ABSTRACT

Systems, methods, and devices for generating three dimensional models, in accordance with at least one embodiment of the present disclosure utilizes stereo, nadir, oblique and street view images of a structure to determine with high precision the location of one or more points on a structure. Using the determined location of such one or more points, multi-dimensional models of a structure may be generated. The models may be used and presented in one or more points to determine spatial, orientation and other characteristics of structures.

18 Claims, 16 Drawing Sheets

SYSTEMS, METHODS, AND DEVICES FOR GENERATING THREE-DIMENSIONAL MODELS

CROSS-REFERENCE TO RELATED APPLICATION

This application claims the benefit under 35 U.S.C. § 119(e) of U.S. Provisional Patent Application No. 62/311,566, filed on Mar. 22, 2016, and entitled "Method and Apparatus for Constructing 3D Building Models and Generating Property Intelligence Reports from Oblique and Nadir Aerial Images," the contents of which are incorporated by reference as if fully disclosed herein.

FIELD

The technologies described herein relates to systems, methods, and devices for use in generating virtual three-dimensional models of buildings, bridges, poles, towers, sidewalks, parking lots, vehicles, foliage, topographical features, other objects, and elements of such objects (such as a window on a building, an HVAC system on a roof of a building or otherwise) (hereafter, "structures"). The technologies described also relate to the surveying and mapping of any individual or collection of structures, and the use of photogrammetry to generate three-dimensional models of one or more of such structures. The technologies described also relate to using images captured using aerial, ground, and other image capturing platforms to determine the location of one or more points on a structure and to generate models, in two or more dimensions, of such a structure.

BACKGROUND

Photogrammetry is the science of determining measurements, based on images, such as photographs, between two or more elements of structures. The images may be captured digitally or in analog format. Analog images are typically converted to digital images using known systems and processes. As images are captured, locations of object points within an image are defined based on known characteristics of an imaging platform, such as the geometric parameters of the imaging process including variables for lens focal length and lens distortion values. Such known characteristics of an imaging platform are referred to herein as the "interior orientation" for an imaging platform. The locations of objects, as captured by an imaging platform, are also based on exterior characteristics, such as the location and orientation of the image capturing device in time and/or space, atmospheric interferences, lighting variances, and other known and/or measurable characteristics of the environment in which a given image is captured using a given imaging platform. Such known exterior characteristics are referred to herein as the "exterior orientation" for an imaging platform. It is to be appreciated that the exterior orientation may vary from image to image, shot to shot, time to time and otherwise. Likewise, while the interior orientation generally remains constant, external orientation conditions may also affect interior orientation characteristics of a given imaging platform at a given time. For example, temperature, humidity, radiation, and other external characteristics may affect the internal orientation characteristics of an imaging platform for any given image captured. The effect of such environmental and other conditions on imaging platforms are well known in the art and may be measured and captured using known techniques. The determining and characterization of interior orientation and exterior orientation characteristics is commonly possible today using modern digital photography and other imaging equipment, high-accuracy Geographic Positioning Systems (GPS) technologies, and computer-vision technologies. While the science of photogrammetry has been simplified technically, its fundamental principles of mathematic calculations remain static.

Today, digital multi-view camera systems may be configured to capture terrestrial (often referred to as "street view"), and aerial oblique and nadir images in limitless configurations. Such images may be captured using ground, aerial, combinations thereof and other imaging platforms. Oblique imagery has traditionally focused on capturing images at an angularity near or close to 45-degrees from perpendicular to a known basis, such as a ground level, to leverage Pythagorean theorem geometric principals of one meter out equals one meter up for a point or position on the ground in a 45-degree perspective. Commonly, oblique and nadir images are captured using aerial or space-based platforms. While oblique images may display the tops and sides of structures, oblique images are commonly restricted to viewing the sides of a structure that are perpendicular to the focal plane of the imaging system. Therefore, imaging systems may capture multiple oblique images from multiple vantage positions. Similarly, top down or nadir imaging systems are commonly utilized to capture top views. The combination of street, oblique and nadir images of a structure are collectively referred to herein as an imagery dataset.

Each pixel in a digital image is collected by sensing photons that are emitted from a source, such as the sun, an imaging platform's "flash" unit or other emitter of electromagnetic radiation, and reflect off one or more locations on a structure. Such photons often arise in the visible portion of the electromagnetic spectrum, but may arise in other portions. These photons reflect off the structure, at one or more given points, travel through space, and are captured by a charge coupled device (CCD), or a similar sensor, on a focal plane of an imaging platform. Each photon so captured corresponds to a pixel of a digital image. A vector defines the direction and angle at which each such photon, as reflected off a portion of a structure, travels to the focal plane of an imaging device. Accordingly, each pixel in a digital image has a corresponding light ray vector for that photon reflected off of a given point on a structure. Matter between the point of reflection of a given photon and the CCD mechanism may refract, slow, or otherwise interfere with or alter the linear path of a given photon. Examples of interfering materials include atmosphere, glass or lens materials, and other substances. But, the principals of light wave propulsion are linear in principal. Hence, if the interior orientation and the exterior orientation of the imaging system are known for a given image capture, a linear vector model will correspond to each photon reflected from a point on the structure and onto a pixel on the focal plane of the imaging device. To simplify this logic, if a focal plane includes 4096 pixels, 4096 linear vector models may exist and correspond to 4096 photons having been reflected by and traveled between multiple points on a structure and onto the focal plane of the imaging device. Such vector models may be calibrated and re-calibrated, as necessary, using known technologies.

With multiple images of a given structure being captured, multiple vectors corresponding to a given point on such structure may be captured. To date, systems, methods, and devices are incapable of using such multiple vectors to determine a highly accurate location of such a given point on a structure.

Therefore, a system, method and device is needed that enables high precision spatial modeling of linear vectors from multiple pixels captured in two or more images. Such images being captured from nadir, oblique, street and other vantage points. Such needed systems, methods and devices should enable the identification of intersection points between disparate linear vectors from multiple different images, captured at multiple different vantage positions for a given point on a structure. Further, a need exists for accurate geo-location and accurate measurements to be extracted from high precision images to enable the generation of high-precision, three-dimensional models of such structures. Moreover, what is needed is a system, method and device for photogrammetry that enables limitless automated measurements of points on a structure based on prior determinations of the absolute location of one or more points on a structure in a given two-dimensional or three-dimensional coordinate system. Furthermore, a need exists for systems, methods and devices that enable the use of such individualized two-dimensional and three-dimensional structural forms to provide structural details about a structure, that may be static or moving at any given time of image capture, such as a structure's volume, size, area, angularity, slope, orientation, relative position vis-à-vis another structure, surrounding topological feature, and other information.

SUMMARY

This summary is provided to introduce simplified concepts, systems, methods, and devices for determining one or more locations of a point on a structure and generating a model of such structure based on one or more images captured from two or more vantage points using a imaging platform with respect to which such imaging platforms internal orientation and external orientation characteristics are known or knowable.

In accordance with at least one embodiment of the present disclosure a system for determining a location of a point on a structure may comprise a first imaging platform, having a first focal plane having a first sensor capable of detecting a first photon. The first photon may be reflected off a first point on a structure, along a first path towards the first imaging platform, and onto the first sensor. The first imaging platform may also include an image processor configured to sense the first photon on the first sensor and capture a first image of the first point on the structure having an array one or more first pixels when the first imaging platform is at a first vantage point. At least one first internal operation characteristic may be associated with the first imaging platform. The system may also include a computing system, comprising a database and a processor. The first image may be stored in the database and the processor may be configured to determine a position of the first point on the structure by performing computer software operations including selecting the first image from the database, selecting a first reference system, identifying a subset of the array of one or more first pixels from the first image as corresponding to the first point, determining a first vector defining the first path, and determining the position of the first point on the structure relative to the first reference system based on the first vector.

In accordance with at least one embodiment, the system may comprise a processor configured to determine the first vector based upon the at least one first internal operation characteristic and based upon at least one first external operation characteristic. For at least one embodiment, the first photon may arise along a visible wavelength portion or other portion of the electromagnetic spectrum. In accordance with at least one embodiment, the system may include use of an imaging platform where at least one external operation characteristic includes the distance of the first imaging platform from the first point on the structure when the first imaging platform is located at the first vantage point. At least one first external operation characteristic may include an orientation of the first imaging platform relative to the structure. The system may be used where a first vantage point provides a nadir view of the first point on a structure.

In accordance with at least one embodiment, the system may include an imaging platform having a first sensor configured to detect a second photon reflected off the first point, along a second path towards the first imaging platform, and onto the first sensor when the first imaging platform is at a second vantage point. The image processor may be further configured to sense the second photon on the first sensor; capture a second image of the first point on the structure as an array one or more second pixels when the first imaging platform is at a second vantage point; and wherein the processor is configured to determine a second vector defining the second path and determine the position of the first point on the structure relative to the first reference system based on the first vector and the second vector.

For at least one embodiment, the processor may be configured to determine the second vector based upon the at least one first internal operation characteristic and based upon at least one second external operation characteristic. A second vantage point may provide an oblique view and/or a street view of the first point. One or more aerial imaging platforms may be used for at least one embodiment.

The processor may also be configured to locate the first point on the structure in a three-dimensional space by performing computer software operations including selecting a second reference system, and determining the position of the first point on the structure relative to the second reference system based on the second vector. A first reference system may include plane and a second reference system may include an axis of rotation.

In accordance with at least one embodiment, the first focal plane of the first imaging processor may include a second sensor capable of detecting a third photon and a fourth photon. The third photon may be reflected of the first point on the structure, along a third path towards the first imaging platform, and onto the second sensor. A fourth photon may be reflected off the second point on the structure, along a fourth path towards the first imaging platform, and onto the second sensor. The first imaging processor may be configured to sense the third photon on the second sensor and generate a third image. The third image may identify the first point on the structure as an array of one or more third pixels. The first imaging processor may be configured to sense the fourth photon on the second sensor and generate a fourth image, where the fourth image further identifies the second point on the structure as an array of one or more fourth pixels. The processor may be configured correlate the array of one or more first pixels with the array of one or more third pixels. The processor may be configured to correlate the array of one or more second pixels with the array of one or more fourth pixels.

In accordance with at least one embodiment, the system may include a processor configured to generate a model of a structure by correlating the first reference system with the second reference system, selecting a coordinate system for the model, based on results of the correlation of the array of one or more first pixels with the one or more third pixels, identify the absolute location of the first point on the structure relative to the coordinate system, based on results of the correlation of the array of one or more second pixels with the one or more fourth pixels, identify the absolute location of the second point on the structure relative to the coordinate system, determine the location of the second point relative to the first point, and generate a model of the structure by depicting the location of the second point relative to the first point in the coordinate system. The relationship between the first array and the second array may indicate opposing ends of a plane forming a side of the structure.

In accordance with at least one embodiment, the various processing operations may be repeated with respect to one or more third points on the structure. The one or more third points on the structure may be each captured on one or more fifth images. The one or more fifth images may be captured by the first imaging platform at one or more third vantage points. The one or more fifth images may be captured based on one more third photons being sensed by the first focal plane. The one or more fifth images may represent the one or more third points on the structure as an array of one or more fifth pixels. The processor may be configured to identify the location of the one or more third points on the structure relative to at least one of the absolute location of the first point and the absolute location of the second point. The processor may be configured to generate a three-dimensional model of the structure by depicting the location of the third point relative to each of the absolute location of first point and the absolute location of the second point in the coordinate system.

In accordance with at least one embodiment, the system may include a first imaging platform configured to capture photons in the infra-red portion of the electromagnetic spectrum. In accordance with at least one embodiment, the system may the capture images of a structure from a first vantage point providing a nadir view of the first point and an oblique view of the second point. The second vantage point may provide an oblique view of the first point and a nadir view of the first point.

BRIEF DESCRIPTION OF THE DRAWINGS

The features, aspects, advantages, functions, components, device, systems, and methods provided by the various embodiments of the present disclosure are further disclosed herein for at least one of the following descriptions and accompanying drawing figures.

DETAILED DESCRIPTION

The various embodiments described herein are directed to systems, methods, and devices which facilitate high-precision measurements and multi-dimensional, including two-dimensional, three-dimensional, and four-dimensional modeling of structures. A four-dimensional model of a structure may show variances in points on the structure over time. Such variances may arise from movement of the structure, as may occur from shifting ground, movement of the structure itself, or otherwise. As used herein a high-precision measurement is one where the absolute location of a point on a structure is determined to within an error of 25 centimeters in three-dimensional space as of a given time or period. In accordance with at least one embodiment, any given location within such multi-dimensional space may be determined in accordance with any known or later arising coordinate or position identification system.

Figure 1A:
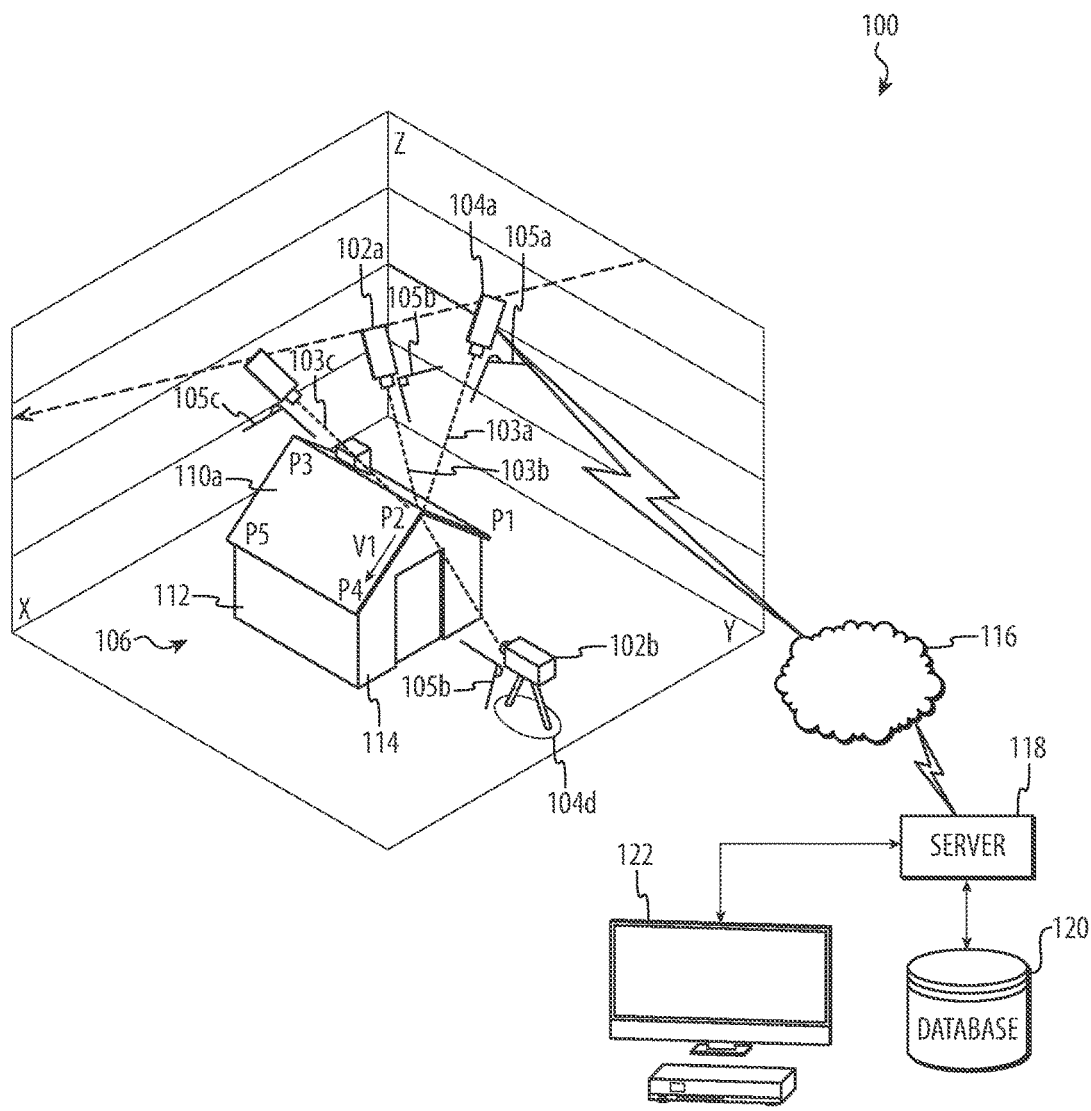
FIG. 1A illustrates the use of an aerial imaging platform and a stationary street level imaging platform to capture one or more images of a structure from one or more vantage points in accordance with at least one embodiment of the present disclosure.
Figure 1B:
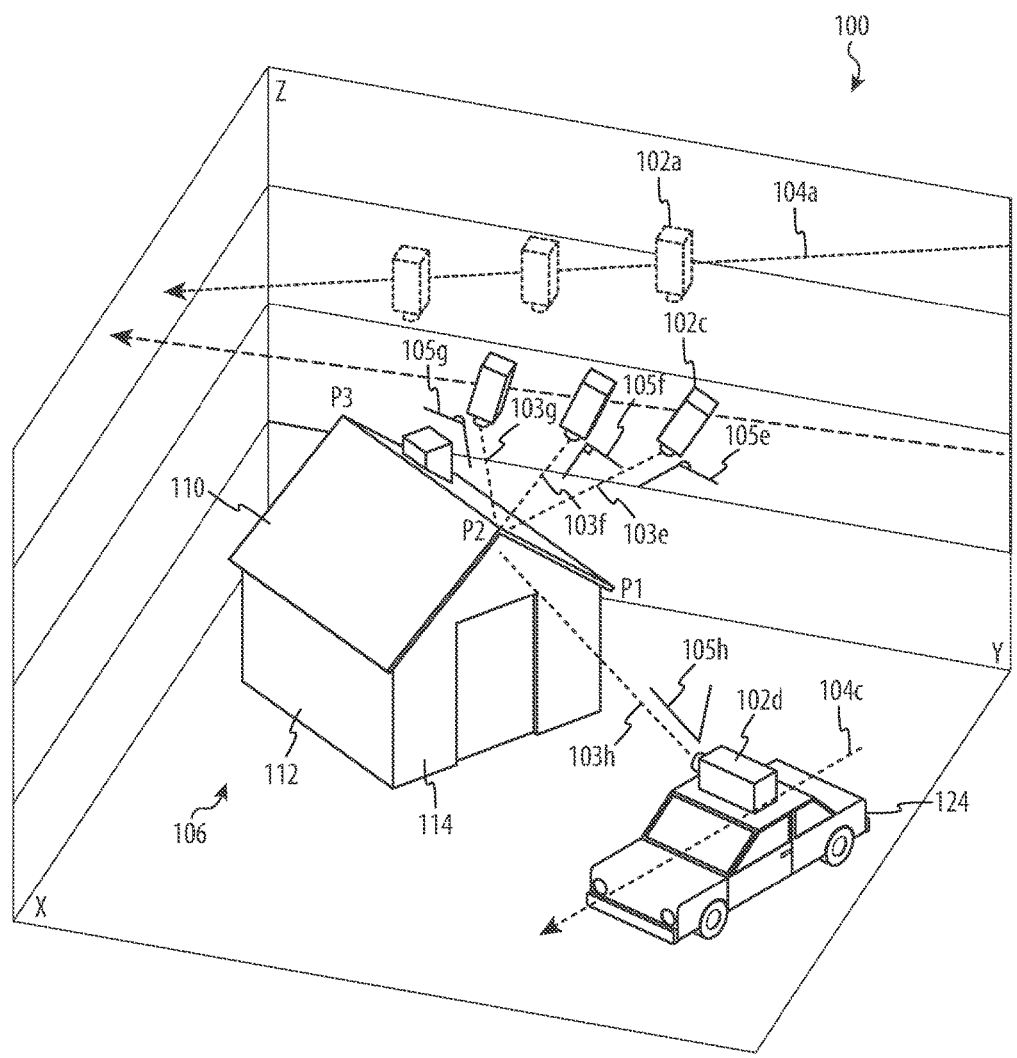
FIG. 1B illustrates the use of one or more aerial imaging platforms, traversing one or more imaging paths, and an automobile based imaging platform to capture one or more images of a structure from one or more vantage points in accordance with at least one embodiment of the present disclosure.

As shown in FIGS. 1A and 1B for at least one embodiment of the present disclosure, a system 100 for generating multi-dimensional models of structures may include a first imaging platform 102, such as an aerial based camera system. The first imaging platform 102 may include one or more camera elements configured to capture one or more images of a given structure using one or more wavelengths along the electromagnetic spectrum. Imaging platform 102 may also include one or more image processing, position determination, data storage and similar image capturing components commonly known and used today. In accordance with at least one embodiment, visible and/or infrared wavelengths may be utilized to capture a given image of a structure. The one or more camera elements in imaging platform 102 may be configured to take monocular and/or stereographic images. The one or more camera elements may be configured to capture still, moving picture, fast-action, slow-motion, or other images at any desired frame rate or frame interval. The one or more camera elements in imaging platform 102 may be configured to capture images at any resolution. For at least one embodiment, a suitable resolution is one where each 2 pixels captured on an imaging plane equates to an absolute accuracy of 25 centimeters or better of the actual size between a first point and a second point on the structure. Other pixel resolutions may be utilized, with such other resolutions providing higher or lower measurement accuracy. It is to be appreciated that the resolution and accuracy of an imaging platform may vary based on interior and exterior orientation characteristics. Such characteristics may include, for example, the distance of the imaging platform from a structure at the time of image capture, the orientation of the imaging platform at a given vantage point relative to the point on the structure being captured, environmental conditions, the aperture, focal length, focusing distance, wavelengths utilized, lens properties and other internal orientation characteristics existing a time or over a period of image capture(s) for a given point of a structure. It is to be appreciated that multiple points on a structure may be captured in a single image and the internal orientation characteristics may vary from point to point so captured. Accordingly, varying resolutions may be utilized in accordance with at least one embodiment based on then arising interior orientation and exterior orientation f.

Figure 4:
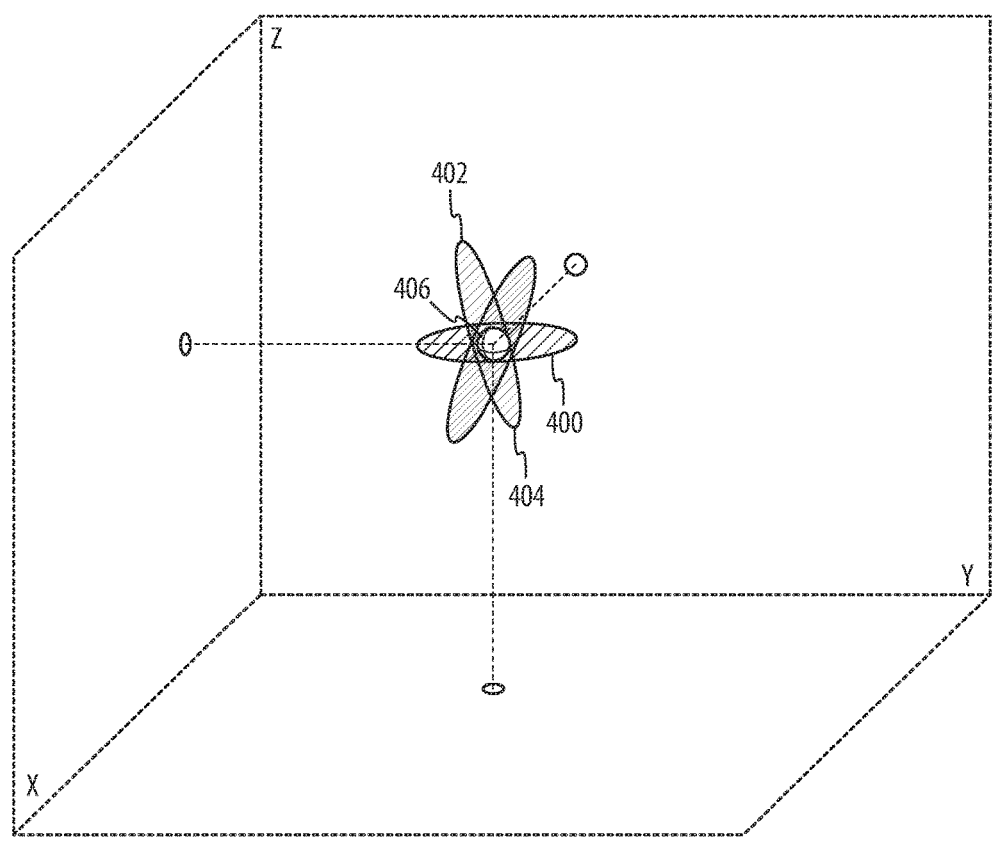
FIG. 4 is a representation in a three-dimensional space of the images shown in FIG. 3 and as captured by from the multiple vantage points in accordance with at least one embodiment of the present disclosure.

As shown in FIGS. 1A and 1B, any given structure 106 may be defined by one or more points, P1-P5, corresponding to one or more structural elements. These points and other points (not shown) may be used along with one or more planes arising with respect to desired coordinate system to define the structure in space and/or time. For example, a roof view may be defined by a left portion 110a and a right portion 110b, where the left portion 110a may be defined as the plane formed by points P2-P3-P4-P5. A structure 106 may one or more sides associated with it, such as a left-side 112, a right-side 113 (as shown in FIG. 4), and a front 114. Each of such side may be defined by two or more points and two or more vectors defining relationships (angle and distance) between such points. The points may be located at any desired distance or proximity from each other. For example, a vector V1, may define the slope of the left portion 110a of the roof based on an angle (relative to ground) from point P2. Vector V1 may also define the width of the left portion 110a of the roof by specifying the distance between points P1 and P4. Further, a point, such as P2, may represent a specific architectural feature of a structure, such as an apex of a roof. Other points may define properties and features of a structure, such as the location and size of a door, the location of an HVAC unit, or otherwise.

As shown in FIGS. 1A and 1B, the system 100 and one or more first imaging platforms 102a-d may be configured to capture one or more images of a structure 106 along one or more imaging paths 104a-104c or at one or more fixed locations 104d. The location of imaging platform 102a-102d at a given point along an imaging path 104a-104c or at a fixed location 104d may be determined in terms of altitude, speed, direction, position, orientation (relative to a given structure or coordinate system), or as otherwise desired. The imaging paths 104a/b/c may be accomplished using any suitable vehicle including, but not limited to, airplanes, drones, blimps, satellites, rockets, cars, and otherwise. The fixed imaging positions 104d may be accomplished using tripods, stationary vehicles, hand-held, or otherwise. Fixed imaging positions 104d may be located at any desired location and/or at an altitude or elevation relative to the structure 106. The one or more first imaging platforms 102a-102d may be configured to capture one or more images from multiple vantage points 105a-105h along the one or more imaging paths 104a-104c or at the one or more fixed locations 104d. For example, the system 100 may be configured such that as the first imaging platform 102a passes over a structure 106, multiple images may be captured of such structure and from one or more vantage points 105a-105c. Likewise, at the same or a later time, a second imaging system 102b/102c/102d, may capture one or more images of the structure 106 from one or more second vantage points 105d-105h. Such second vantage points 105a-105h may be orientated relative to a given point, such as point P2, on the structure 106 to generate an oblique, nadir, street of other image of the structure 106 and one or more points thereon. For example, with respect to point P2 of structure 106, vantage points 105a/105c/105e/105g provide an oblique view, vantage points 105b/105f provide a nadir view and vantage points 105d/105h provide a street view. It is to be appreciated that a given vantage point and a given image captured thereat may provide a different view type with respect to two or different points on a given structure. For example, vantage point 105f may provide a nadir view of point P1 while also providing an oblique view of point P3.

Each of the two more vantage points 105a-105h at which an image of a given point on a structure is captured may be defined based upon the angle and location (each so vantage point being defined herein as the "capture orientation") of the imaging platform 102a/102b/102c relative to the point on the structure at the time of image capture, as determined in view of a designated coordinate space, as represented by the X, Y and Z axes in the drawing figures. Each vantage point 105a-105h and capture orientation corresponding thereto can be defined by an "imaging vector", such as vectors 103a-103h. Imaging vectors correspond to and define the direction and distance a given photon travels, as reflected off a given point, such as point P2, to a given imaging platform 102a-102c at a given time and location of image capture by the imaging platform 102a-102c.

The imaging data captured by an imaging platform 102a-102c may be communicated by one or more communications links 116 to a local or remote server 118, data storage device or system 120, and/or to one or more user interface 122 devices. It is to be appreciated that the images captured by imaging platform 102a-102c may be communicated, processed, stored, and/or used at the time of capture or any later time, as desired for any given embodiment. The storage, processing and use of images may occur local and/or remote to any given imaging platform 102a-102c using any known or later arising computing devices, technologies and/or systems. The features, functions, and capabilities provided by server 118, database 120, and user interface devices 122 may be provided using any known or later arising computing, storage, and/or user interface technologies. Such technologies may arise in any desired computing configuration including, but not limited to, those local, remote, distributed, blade, virtual or other configuration relative to an imaging platform and/or any devices and/or systems configured for use in support of the one or more embodiments of the present disclosure.

Each imaging vector 103a-103h defines a proximate location of a given point, such as P2, on the structure 106 based on the capture orientation of the imaging platform 102a-102c at a given vantage point 105a-105h and at a given time. Positional, vector measurement and other errors may arise due to interior orientation and exterior orientation characteristics. The use of known calibration techniques may diminish, eliminate and/or negate the impact of such errors upon a determination of an absolute location of a point on a structure in accordance with at least one embodiment of the present disclosure.

As discussed above, for at least one embodiment, an imaging platform may be configured to provide a resolution of 2 pixels corresponding to 25 centimeters of the actual size of a structure. Or, stated differently, every 25 centimeters along a structure a different point may be reflected off such structure and captured by an imaging platform.

Figure 2:
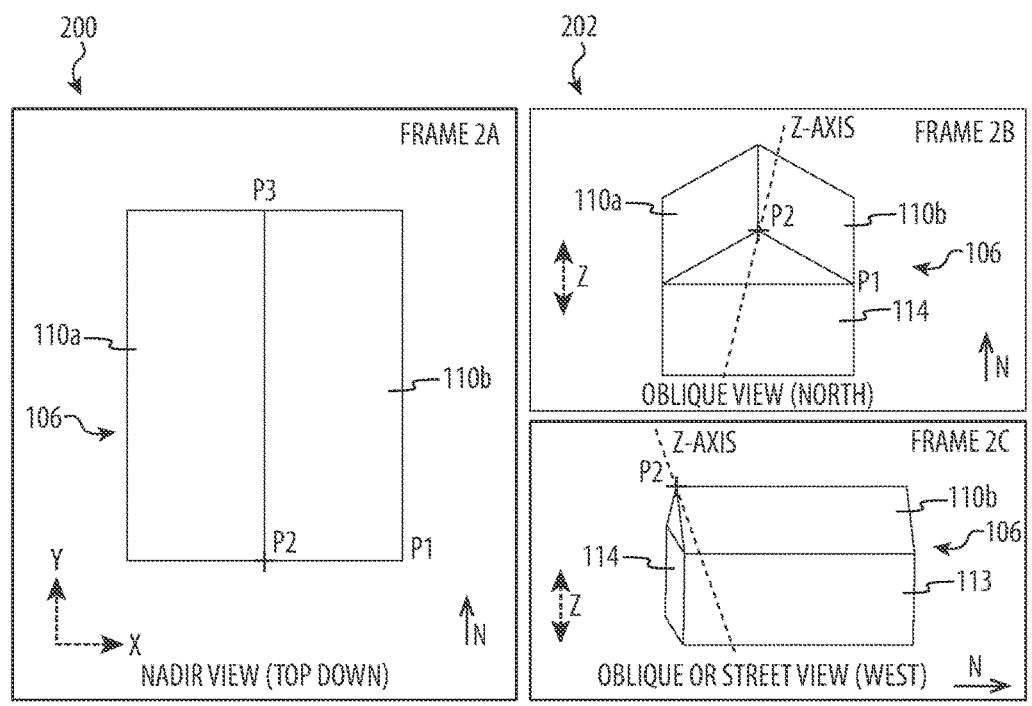
FIG. 2 is a pictorial representation of multiple views depicting points on a structure that may be located and modeled in accordance with at least one embodiment of the present disclosure.

As shown in FIG. 2 and in frames 2A/2B/2C, where with respect to a given structure 106, frame 2A shows a nadir view, frame 2B shows an oblique view, and frame 2C shows a street view, the images captured of the sides (e.g., roof 110a/110b, left 112, right 113, and front 114) of structure 106 may form various views, such as first view 200, second view 202 and third view 204. These views may form a part of the imagery dataset and may be used to determine a location of a point, e.g., P2, in a given coordinate space, on the structure. For example, an image captured from vantage point 105b may form a nadir view, as shown by first view 200. Imaging vector 103b corresponding to the image captured at vantage point 105b may be used to define the location of point P2 in an X-Y plane of the X-Y-Z coordinate system shown in FIGS. 1A and 1B. Similarly, one or more oblique aerial images, such as an image captured from vantage point 105a, may form an oblique view, as shown by second view 202. Similarly, one or more street view images, such as an image captured from vantage point 105d, may form a street view, as shown by third view 204. The locations of P2 as defined base on corresponding vectors, such as vectors 103a and 103h, may be used to define the Z location of point P2. It is to be appreciated that the location of a structure may be defined in view of coordinate systems, such as X-Y-Z, latitude/longitude, or otherwise, as well as in terms of orientation, such as by degrees North.

Figure 3:
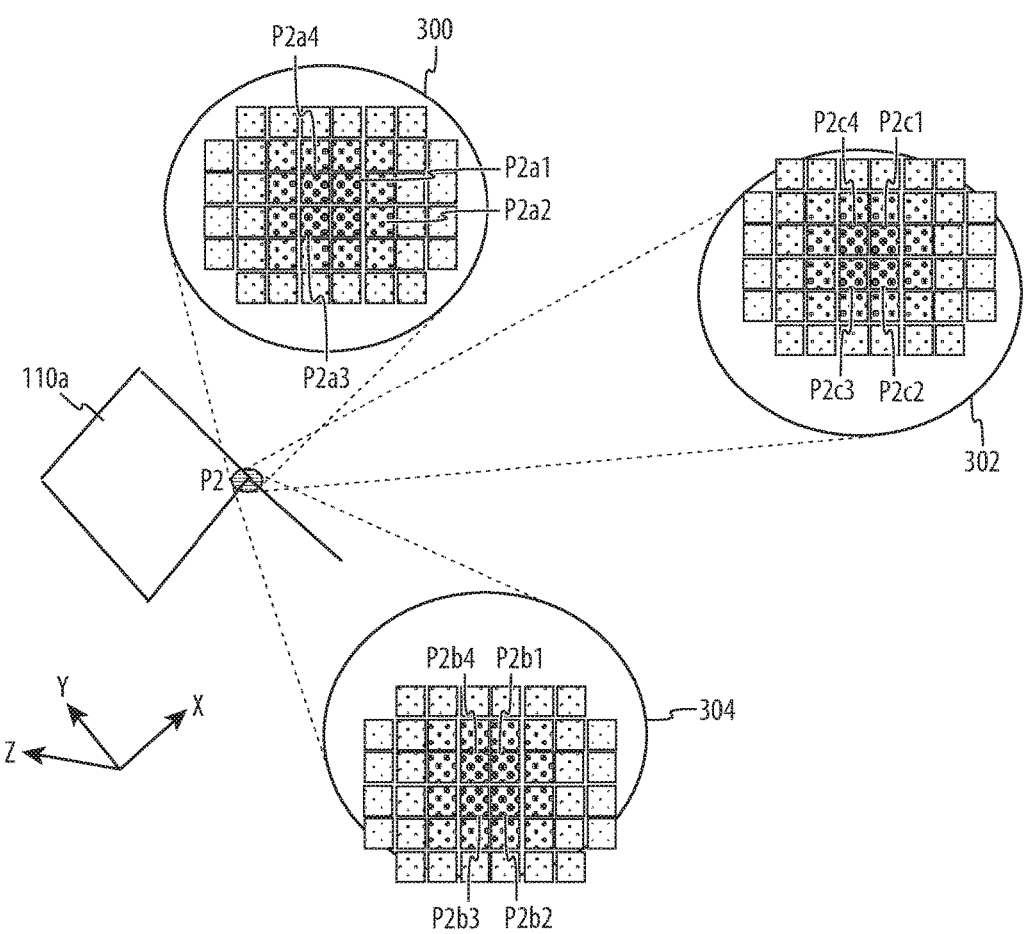
FIG. 3 illustrates pixel representations of a point on a structure as captured by multiple images from multiple vantage points in accordance with at least one embodiment of the present disclosure.

More specifically, as shown in FIG. 3 with respect to point P2 of structure 106, the photons reflected from point P2 may detected by imaging platform 102a to form a first image 300, where in this example the first image 300 is captured from a nadir vantage point, such as at vantage point 105b. A second image 302 captured may be, for example, from an oblique vantage points, such as at vantage point 105a. A third image 304 may be captured from a street view vantage point, such as at vantage point 105d. The collection of images 300/302/304 may be considered to provide an imagery dataset for point P2 of structure 106. One or more first, second or third images may be used to define an imagery dataset for a given point and used to determine the absolute location of any such point. It is to be appreciated that the precision of location identification may be based on the different capture orientations arising from one or more nadir, oblique and/or street view images utilized, and in view of variances in interior and exterior orientation characteristics from one imaging platform to another and over time, it is to be appreciated that each of the first, second and third images may result in images having varying imaging properties. These imaging properties may correspond to differences in luminance, wavelength, intensity, or other image properties. To adjust for these varying imaging properties, per at least one embodiment, each image may be converted into a grey scale representation, such as shown in FIG. 3 for images 300, 302 and 304. Each greyscale representation corresponds to the photons captured by an imaging platform 102a-c at a given vantage point.

As further shown in FIG. 3, the intensity of the one or more pixels corresponding to the multiple photons reflected at or about a point, and as captured in the images 300/302/304 at each of the multiple vantage points, when represented in a grey scale, will generally result in distinct pixel patterns of varying intensities for the point. For example, a given pattern for any given representation of a point in an imagery data may include one or more dark pixels, e.g., pixels P2a1/P2b1/P2c1, one or more moderate pixels, e.g., pixels P2a2/P2b2/P2c2, and one or more light pixels, e.g., pixels P2a3/P2b3/P2c3, where each pixel corresponds to a distinct vector 103 which in view of a known vantage point location 105, defines a distinct location in a coordinate system. Various imaging processing techniques may be applied to each image captured in an imagery dataset for a given point to determine which vectors (each vector corresponding to a given pixel in a captured image) relate to a given point. These vectors represent a location of point, such as P2, in the multi-dimensional space. The absolute accuracy of a location may be represented by an expected point and an error range in two or more dimensions. For purposes of illustration, such accuracy range is depicted as one or more planes, such as planes 400a, 402 and 404, as shown in FIG. 4. The absolute location of a point in a coordinate system may be represented by a sphere 406, which may be computed based on the vectors utilized, known error range thereof, and in view of known computational techniques.

For example, one or more of the darkest, such as pixels P2a1-4/P2b1-4/P2c1-4, may be identified in each image 300/302/304 and designated as corresponding to a given point P2. The one or more of the vectors corresponding to pixels P2a1-4a, may be used to define the position of P2 in a nadir view, such as first view 300. Similarly, one or more of the vectors corresponding to one or more of pixels P2b1-4 and P2c1-4, in the imagery dataset may be respectively processed to determine the position of P2 in an oblique view, such as second view 302, or for a street view, such as third view 304. The resulting intersection of such positions may be represented in a three-dimensional space as the absolute location, which is illustrated in FIG. 4 by absolute sphere 406, where a first plane 400 represents the position of P2 based on the nadir view 200, second plane 402 represents the position of P2 based on oblique view 302, and the third plane 404 represents the position of P2 based on street view 304.

In short, in view of interior orientation and exterior orientation characteristics and as shown in FIG. 4, each view of a given point P, as based on one or more imaging vectors 103a-103h and in view of the given vantage point 105a-105h, can be defined as correspond to a location in a three-dimensional coordinate system within a known error probability. Such known positional error probability, in three-dimensional space may be represented mathematically using known techniques, or graphically by a bounding three-dimensional sphere, such as nadir view 400, oblique view 402 and street view 404. Where that absolute location of the given point arises somewhere within such three-dimensional views, as illustrated by absolute sphere 406.

While not shown in FIG. 4, it is to be appreciated, that the resulting volumetric sphere 406 associated with a given point P may be more precisely defined based on multiple nadir, oblique and/or street views. The use of two or more nadir, oblique and/or street views to calculate a location for a given point on a structure may result in the determination of the points location with ever more precision. As used herein, an absolute sphere 406 defines a location of a given point P within 5-25 centimeters in all three directions for the given three-dimensional coordinate space.

Figure 5A:
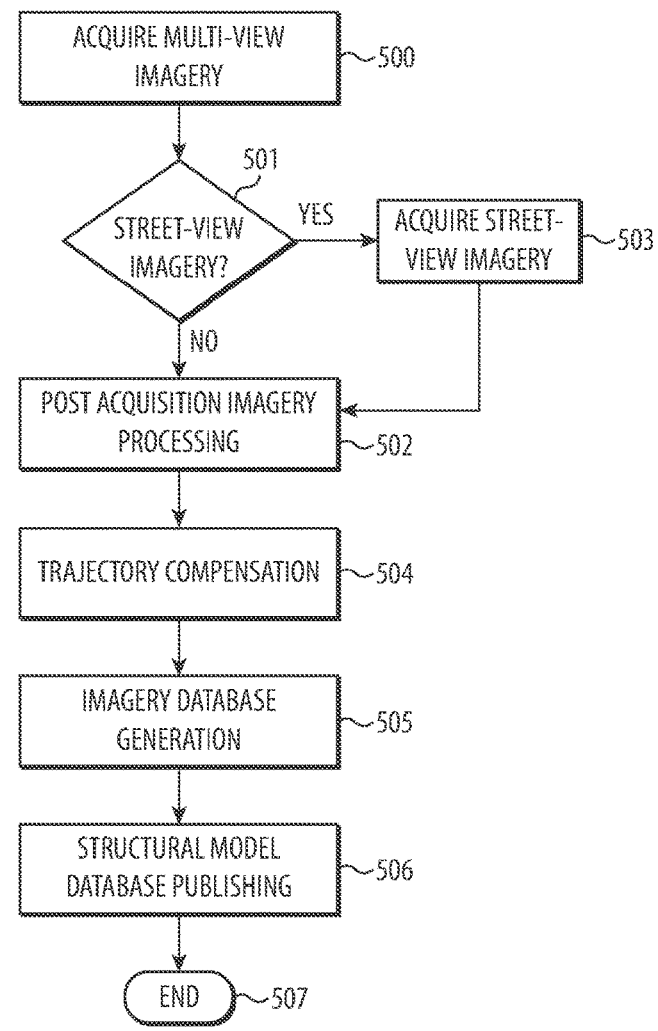
FIG. 5A is a flow diagram for a process for generating a model of a structure in accordance with at least one embodiment of the present disclosure.

As shown in FIG. 5A for at least one embodiment of the present disclosure, a process for generating and publishing models, including 3D models, of structures may include the operation of acquiring multi-view imagery, as per Operation 500. As used herein, multi-view imagery includes one or more images that provide views of a structure from two or more vantage points. In accordance with at least one embodiment, views from such two or more vantage points may be acquired by capturing an image of a structure at different vantage points along one or more imaging paths, such as imaging paths 104a-c (see FIGS. 1A and 1B), using stereoscopic imaging platforms, or using any other presently known or later arising imaging platforms and/or technologies. The process may also include a determination as to whether one or more street-view images are available, or to be captured, for a given structure, as per Operation 501. In accordance with at least one embodiment, the generation of a model of a structure requires the use of one or more non-street-view images. In accordance with one or more other embodiments, however, models of structures may be generated using only street-view images, with the recognition that the modeling of certain features, form and/or functions of a given structure may be limited, especially when street-view images obtainable only from public rights-of-way are to be utilized. Per Operation 503, when street-view images are to be utilized, one or more vantage points may be selected from at which such image(s) are to be obtained. For at least one embodiment, the use of multiple street-view images obtained from known vantage point locations facilitates the generation of high precision models of structures. Vantage point locations may be known using high precision surveying technologies well known in the art.

After the images desired to modeling a structure are obtained, per Operation 502, one or more post-image acquisition processing technologies may be applied to one or more of such images. Examples of such post acquisition imagery processing technologies are described below in greater detail with respect to FIGS. 5A-5C and include the use of one or more combinations of known or later arising image processing technologies, such as area based image matching, feature based image matching, hybrid image matching, and multi-image matching.

Per Operation 504, the process may also include the use of trajectory compensation techniques and technologies. It is to be appreciated that the use such known and/or later arising trajectory compensation techniques and technologies may be desired or needed in those cases where either the imaging platform itself is moving, while images of a structure are being captured, and/or where the structure itself is moving during image capture thereof. Trajectory compensation may also be desired when the accuracy of determining a location of a vantage point for a moving imaging platform lacks a desired or needed precision. Trajectory compensation may factor in variables such as speed and orientation of a vehicle carrying an imaging platform from a known point in determining a location and orientation of a given imaging platform at a second point, a vantage point.

Per Operation 505, upon capturing, processing and determining the location and orientation at vantage point of a given image, such images and/or related data (hereafter, "Image Metadata") may be suitably identified in an imagery database. Any desired technique for sorting and identifying images in an imagery database may be utilized including the use of indexes, relations (as used for example in a relational database), hierarchies, or otherwise.

Per Operation 506, the process may also include the publishing of one or more models or other information for a given structure in one or more databases. As used herein, the publishing of model or other information about a given structure in a database refers to the creation, granting, use and removal of one or more permission models governing the reading, writing, editing, viewing and/or other utilization of such information. As discussed in greater detail below, access to Image Metadata, a model and/or other information regarding a structure may be public, semi-private, or private. Similarly, one or more classifications and/or conditions may be associated with such information including, but not limited to, government security classifications (such as "Top Secret", "Secret"), commercial classifications (such as "Confidential"), financial (such as "free", "pay per view"), or other classifications and/or conditions. The publishing of information acquired, processed, or otherwise generated per one or more embodiments of the present disclosure may include any desired access or other terms or conditions. Upon publishing of such information, the process of FIG. 5A ends, as per Operation 507, and the information may be utilized in any manner permitted in view of one more previously set or later arising terms of conditions associated with such information. The potential uses of such information are likely limitless and examples include determining housing densities, determining run-off and drainage, and otherwise.

Figure 5B:
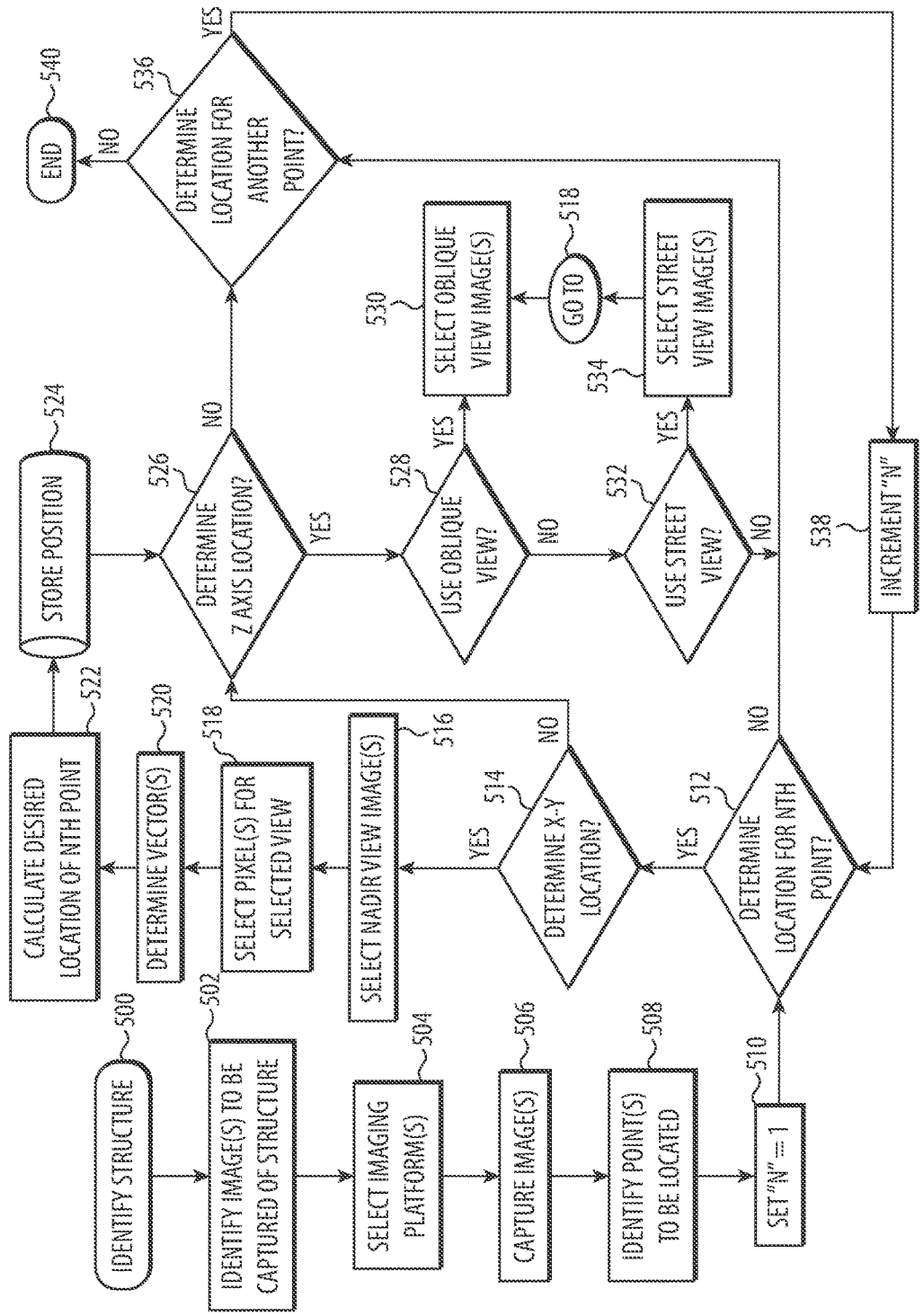
FIG. 5B is a flow diagram for a process for determining a location of a point on a structure in accordance with at least one embodiment of the present disclosure.

As shown in FIG. 5B, in accordance with at least one embodiment of the present disclosure, a process for determining a location of a point on a structure in three-dimensional space may begin with identifying a structure to be modeled, as per Operation 510. Per Operation 512, a determination is made as to which image(s) are desired to develop a model of the structure. It is to be appreciated that the characteristics of the structure, such as height, length, width, location, accessibility, and other characteristics, may be used in determining which images, imaging platform, and vantage points are to be used. The images desired to model a structure may include one or more nadir, oblique, or street view images. For at least one embodiment, each of a nadir, oblique and street view image are utilized. Based on the view and quantity of images desired, one or imaging platforms are selected, as per Operation 514. For example, when one or more nadir views are desired, one or more aerial imaging platforms may be selected to capture one or more nadir images of a structure. Per Operation 516, the desired images are captured. As discussed above, the capture of the desired images may include the capture of a desired view (such as nadir, oblique and street views) from one or more vantage points. Based on the type of imaging platform utilized, the vantage points may be fixed, as provided for example by a tripod mounted imaging platform, or moving, as provided for example by a moving plane, drone, or other vehicle. Nadir and/or oblique images may be captured from fixed locations, such as using cranes or vantage points on other structures or geological formations.

Once the one or more desired images are captured, one or more points on such image(s) may be identified for location thereof based on analyses of pixel density, patterns, gradients, and otherwise, as per Operation 518. Per at least one embodiment, such point location arises based on grey-scale conversions of captured images. It is to be appreciated that only one or multiple points on a structure may be located, as desired for any give use of the structure locating and modeling embodiments of the present disclosure. For example, a use of a structure model to determine whether a structure violates a height restriction, might involve the determination of only a highest point on a roof line of such structure, such as the apex designated by point P2 of structure 106. Similarly, a use of a structure model generated in accordance with at least one embodiment of the present disclosure to determine a structure's bulk plane might require the need to determine the location of multiple points on a structure, such as each of points P2, P3, P4 and P5 of structure 106.

Once the points desired to be located are identified, the process may continue with determining the location of each such point in one or more dimensions. As per Operation 520, a variable "n" is set to the value of "1", and "n" may be utilized to identify one or more points on a structure to be located.

Per Operation 522, the process may continue with an inquiry as to whether the location for the $n^{th}$ point is to be determined; where per a first cycle, the $n^{th}$ point is a designated first point on the structure. If so, the process continues with a determination as to whether the location of the point under consideration is to be made with respect to a first reference, such as an X-Y coordinate system, as per Operation 524. It is to be appreciated that a location of a point may be determined with respect to any planes, axis, coordinate systems or otherwise (each a "reference system"), and in any desired order or sequence of determinations. Also, the order of determination of a location in any reference system is arbitrary. For purpose of this discussion, the first reference system is identified herein as an X-Y plane.

If a determination of a position on an X-Y plane is to be made, the process for the embodiment shown in FIG. 5, continues with selecting one or more nadir view images from an imagery dataset corresponding to the structure, as per Operation 526. It is to be appreciated, however, that other views, such as one or more oblique and/or street views may be used to determine a location of a point on an X-Y plane as desired in accordance with any given embodiment.

Next, as per Operation 528, the process continues with selecting the pixel(s) in each selected image that correspond to the selected point. As discussed above, one or more pixels in a selected image may correspond to a selected point with respect to which the position thereof is desired to be determined. Pixel selection may arise, for at least one embodiment, based on analysis and correlation of grey-scale representations of the selected captured image(s).

In Operation 530, each vector that corresponds to each selected pixel for each selected image is determined. It is to be appreciated that the determination of such vectors may vary from one pixel to another based on internal orientation and external orientation characteristics of the imaging platform(s) utilized.

In Operation 532, the desired location of the point in question is determined. It is to be appreciated that vector mathematics, statistical analysis, and other known computational techniques may be utilized to calculate the location of the point in question in the specified coordinate system.

Figure 5C:
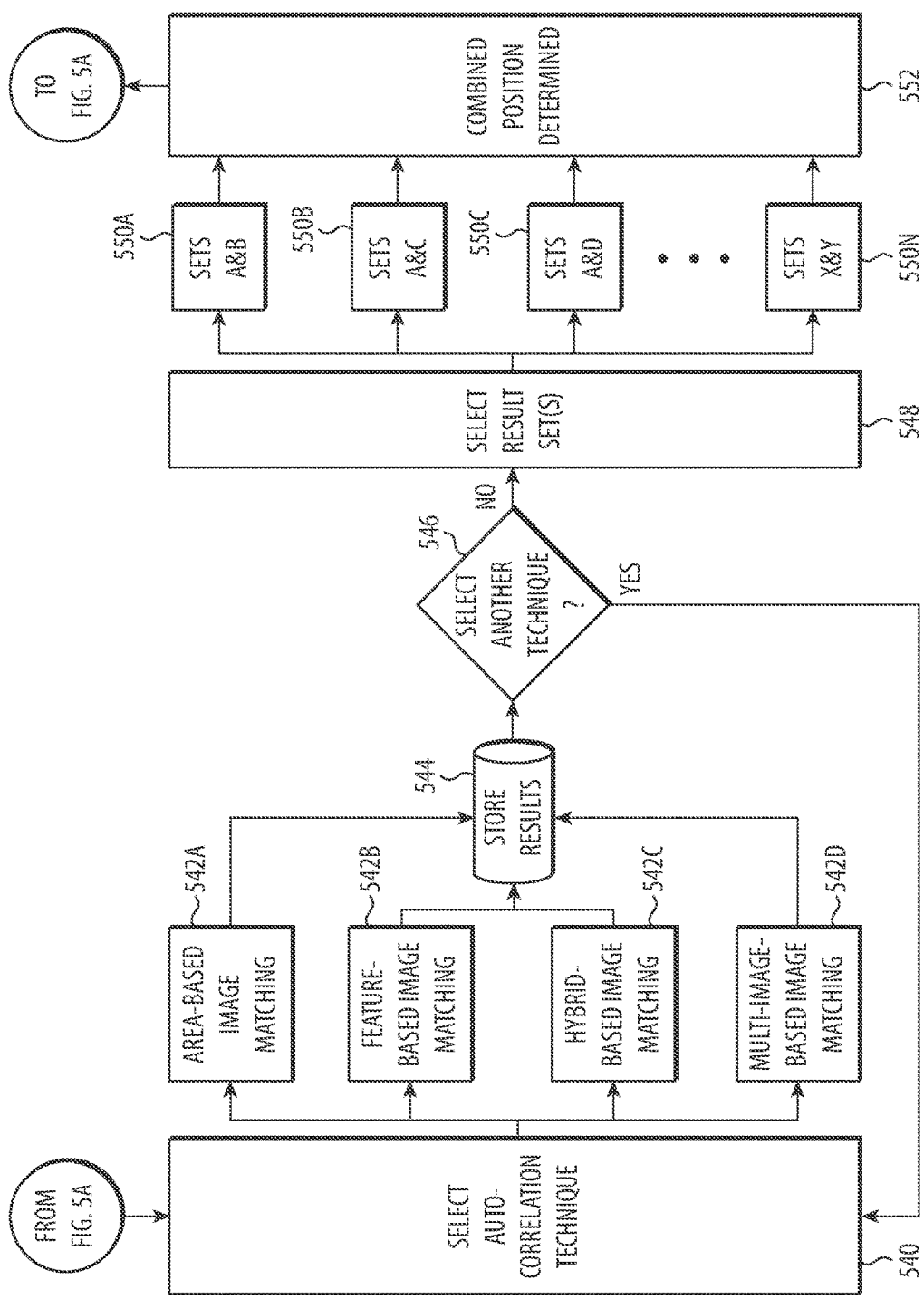
FIG. 5C is a flow diagram for a process for determining one or more correlation techniques for use in determining a location of a point on a structure in accordance with at least one embodiment of the present disclosure.

As shown in FIG. 5C, for at least one embodiment of the present disclosure the operation of calculating a location of a desired $n^{th}$ point may include the operation of determining which of one or more auto-correlation techniques to utilize. It is to be appreciated that such auto-correlation techniques are commonly utilized to generate high-precision determinations of the location of one or more points on a structure, and in view of a given imaging platform. Advances in imaging platform technologies including advances in modeling internal orientation and external orientation characteristics of imaging platforms may result in none of the autocorrelation techniques needing to be utilized. As shown in FIG. 5C, any one or more of various auto-correlation techniques may be utilized, examples of such techniques include area based image matching, feature based image matching, hybrid image matching, and multi-image matching. Other techniques may be used, as desired for any implementation of an embodiment of the present disclosure.

As shown by Operation 542A, area based image matching (ABIM) technologies may be utilized for one or more embodiments of the present disclosure to determine the location of a point on a structure based on two or more images of such structure. ABIM technologies are generally well-known in the art and any of such existing and/or later arising ABIM technologies may be used in conjunction with one or more embodiments of the present disclosure. As used herein, ABIM technologies rely on the matching of two or more pixels and/or patterns of pixels (each a "pixel array") as arising in two or more images of a structure. The pixels and pixel arrays may be rendered and/or represented in terms of grey-scale properties or other properties, such as a color value and variations in color values from one pixel to a next, as may be represented regarding a color palette, color themes, or otherwise. A pixel array may be of any desired size or shape. For example, a "source pixel array" may include an 8×8 square sampling of pixels in a first image of a structure with respect to which a similar sized and collection of pixels are sought in a second image of the structure. "L" shaped, "T" shaped, round, oval, freeform, lines of pixels and other collections of pixels may be designated as the source pixel window, with respect to which, substantially similar collections of pixels (each being a "target pixel array") arising in one or more second images of a structure. It is to be appreciated that the size, and shape, as well as the characteristics of the pixels used (e.g., grey-scale, versus, colorized pixels) in a source pixel array and in the one or more target pixel arrays will influence the effort needed, in terms of computer processing capabilities and processing time, to identify such target pixel arrays, and particular pixels in such arrays, in one or more second images such that a given "source pixel" in a source pixel array is correlated with a given "target pixel" arising in two or more target pixel arrays. Likewise, the number of second images within which a target pixel array and target pixel(s) therein are sought will influence the processing time and number of computations required. However, it is also to be appreciated that ABIM matching can often result in high-precision identifications of a given point on a structure, as arising in two or more images, and as represented by one or more source pixels and target pixels in such respective images. When each of such one or more source and target pixels are associated with unique imaging vectors, high-precision determinations of the absolute location of such point are possible.

As shown by Operation 542B, feature based image matching (FBIM) technologies may be used to determine the location of a point on a structure based on multiple images of such structure and point thereon. FBIM technologies are generally well-known in the art and any of such existing and/or later arising FBIM technologies may be used in conjunction with one or more embodiments of the present disclosure. For FBIM, similarities between a source image and one or more target images are detected. These similarities can then be utilized to align images, and the pixels arising thereon. Similarities that may be utilized include, but, are not limited to, are set forth in List 1.

List 1

Locations on a structure of edges, boundaries, center of mass, etc.
Orientation of edges and boundaries;
Locations of Corners and Intersections;
Shape similarities of edges and boundaries;
Similarities in color;
Similarities in grey scale colors around features on a structure;
Other machine perceptible and identifiable similarities; and
Other humanly perceptible and identifiable similarities.

Per Operation 542B, one or more of the List 1 similarities may be utilized to correlate pixels on a first image with pixels on two or more second images. Given that similarities, versus pixel by pixel comparisons, are utilized, it is to be appreciated that the amount computer processing time used to correlate two or more images FBIM is considerably less than the computer processing time used for ABIM. Per at least one embodiment, FBIM utilizes 35-55% of the processing time of ABIM to correlate two or more images.

As shown by Operation 542C, hybrid based image matching (HBIM) technologies may be used to determine the location of a point on a structure based on multiple images of such structure and one or more points identified thereon. HBIM technologies are generally well-known in the art and any of such existing and/or later arising HBIM technologies may be used in conjunction with one or more embodiments of the present disclosure. For HBIM, combinations of ABIM and FBIM technologies are commonly utilized. Such combinations may include, for example, using known FBIM processes to generally correlate images based on structure features and then using ABIM processes to correlate points on images with high-precision. As used herein, "generally correlate" refers to the aligning of source pixel arrays in a first image with two or more target pixel arrays, where each of such source and target pixel arrays include 75×75 and less than 25% deviation between pixels arises.

As shown by Operation 542D, multi-image based image matching (MIBIM) technologies may be used to determine the location of a point on a structure based on multiple images of such structure and one or more points identified thereon. MIBIM technologies are generally well-known in the art and any of such existing and/or later arising MIBIM technologies may be used in conjunction with one or more embodiments of the present disclosure. For MIBIM, two or more images may be used in the image matching process. For example, two or more stereo pairs of image may be utilized to overcome obstructed views of a structure from a given set of one or more first images by using a different vantage point and/or imaging path with respect to a given set of one or more second images. For example, a first image set obtained using imaging path 104a may result in one or more images captured that present point P6 (see FIG. 6) but do not present point P5 (see FIG. 6), whereas a second image set obtained using imaging path 104c may include the presentation of point P5 but not the presentation of point P6. Using MIBIM technologies, at least one embodiment of the present disclosure facilitates the capture of semi-obscured points and thus a more expansive identification of point locations on a structure, where semi-obscured points are those points not visible from a first vantage point at or along a first imaging path/location that are visible from a second vantage at or along a second imaging path/location. It is to be appreciated that various factors may affect the precision of MIBIM technologies including, but not limited to, image texture (such as the level of gradients of gray-value functions utilized), pixel size (a varying from one image to another), geometric precision of the pixels captured in each image, the size of any window or array of pixels utilized, the shape of any window or array of pixels utilized, image preprocessing techniques applied with respect to a first image and/or imaging platform versus one or more second images as captured by one or more second imaging platforms, signal-to-noise ratios, and other internal orientation and/or external orientation considerations.

Per Operation 544, each of the results of the ABIM, FBIM, HBIM and/or MIBIM processes may be stored in database 120 and one or more of such processes (Operations 542A-D) may be selected, as per Operation 546. It is to be appreciated that the processes may be selected for any desired number of iterations, points on a structure, or otherwise.

Once the desired number and collection of matching processes has been performed and stored, the process continues with selecting from the one or more so stored results, as per Operation 548. Any desired set or permutation of matching processes (ABIM, FBIM, HBIM, MIBM, or otherwise) may be selected, as represented by Operations 550A-550N.

In accordance with at least one embodiment of the present disclosure, the combination of AIBM and FBIM may be utilized, with the results obtained using the AIBM processes being used as inputs to the FBIM process. In accordance with at least one embodiment of the present disclosure, the combination of AIBM, FBIM, and HBIM may be utilized, with the results obtained using the AIBM and FBIM processes being used as inputs to the HBIM process. In accordance with at least one embodiment of the present disclosure, the combination of AIBM, FBIM, HBIM, and MIBM may be utilized, with the results obtained using the AIBM, FBIM, and HBIM processes being used as inputs to the MIBM process.

As per Operation 552, the result arising from the selected matching process(es) is generally a combined position determination, i.e., a calculated location of the point in question. As per Operation 554, the calculated location of the point in question may be stored in a database, such as database 120.

In Operation 556, a determination is made as to whether a location of the point in question is desired with respect to a second reference system. For example, the position of a point along a Z axis of an X-Y-Z coordinate system may be desired. For at least one embodiment, the Z axis may represent the altitude and/or elevation of the point relative to a basis, such as a ground level, sea level or otherwise. If such Z axis determination is desired, the process may continue with a determination as to the types of images to be used and selected from the imagery dataset corresponding to the structure in question. More specifically, per Operation 558, an inquiry may be made as to whether one or more oblique view images of the structure are to be utilized and/or, per Operation 562, whether one or more street view images of the structure are to be utilized. If oblique view images are to be utilized, per Operation 560, the oblique view image(s) to be used are selected and the process continues as per Operations 558 thru 564. Similarly, if street view images are to be utilized, per Operation 564, the street view image(s) to be used are selected and the process continues as per Operations 558 thru 564. The selection of oblique and/or street view images may utilize the same pixel analysis and correlation processes used in selecting nadir view images.

As shown with respect to the embodiments shown in FIG. 5, the determining of X, Y and Z axis positions for a given point of a structure occurs in a sequential manner, with the use of nadir, then oblique and finally street view images. However, the processes of the present disclosure may occur in any desired order, sequence, in parallel, in combination or otherwise. For example, the determination of an X-Y position may be based on vectors corresponding to pixels captured from vantage points resulting in either and/or both nadir and oblique view images. Similarly, the determination of a Z position may be based on vectors corresponding to pixels captured from vantage points resulting in either and/or both oblique and street view images.

Referring again to Operation 532, when a determination in made that X-Y view, or per Operation 556, that Z view image determinations are not desired for a given point, the process continues with Operation 566. Per Operation 566, an inquiry is made as to whether the location of a next point, e.g., a $2^{th}$, $3^{rd}$, $4^{th}$, etc. point, is to be determined. If so, "n" is incremented, as per Operation 568, and Operations 522-566 are repeated for the additional selected point(s). After all selected points are located, the process ends, as per Operation 568.

As discussed above and as shown in FIG. 6, including frames 6A, 6B and 6C which respectively correspond to views 2A, 2B and 2C and show respective nadir, oblique and street views, a structure 106 may be defined by numerous points, such as points P1-P7. For at least one embodiment, every point on a structure need not be determined using the process of FIG. 5. Instead, the location one or more determined points on a structure 106, may be utilized to extrapolate the location of otherwise undetermined points on a structure. For example, assume points P1, P2 and P3 were previously determined using the process of FIG. 5 or a similar process. Once the system has determined where these one or more points on the structure exist in a coordinate system, the system may be configured to automatically search for additional points on the structure and using pixel analysis and correlation techniques well known in the art predict the location of such additional points.

Figure 6:
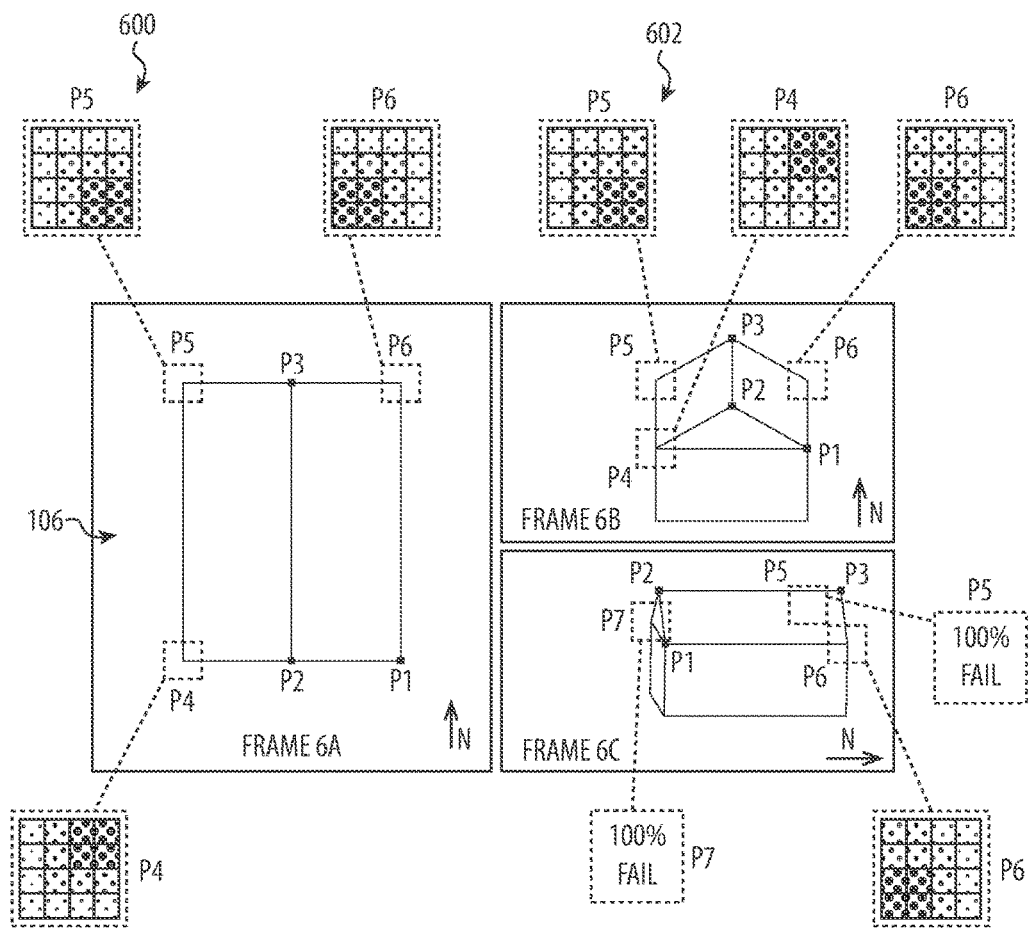
FIG. 6 illustrates grey scale renderings of pixel representations of multiple points on a structure as captured by one or more imaging platforms and as depicted in two-dimensional and three-dimensional models of the structure based on images captured from two or more vantage points and in accordance with at least one embodiment of the present disclosure.

More specifically, in FIG. 6, once locations for each of points P1, P2, and P3 are determined and saved, the system has a blueprint (a pixel map, essentially) for identifying other similarly situated boundary points on the structure. For example, the system may be programmed to recognize that a pattern of four of the darkest pixels in the shape of a square, as per pixels P2a1-4, indicates a boundary point on the structure. As described above regarding point P2, per at least one embodiment, the grey scale representation of point P2 resulted in a pattern of four darkest pixels P2a1-4, in a nadir view image 200, identifying an apex for the roof 110a/110b of the structure 106, and in view of one or oblique view images 202 and/or street view images 204 identifying the southernmost end of the structure 106. Similar pixel patterns may also have been so determined to designate points defining the northernmost end of the structure, such as point P3, and the easternmost end of the structure, such as point P1. Likewise, the system may be configured to perform an analysis of the absolute locations of two or more points, such as points P1 and P2, in view of their corresponding pixel patterns and determine the relative shape of the structure. For example, an analysis of the structure at point P1 would likely result in a pixel pattern corresponding to the patterns shown in FIG. 6 with respect to point P6, with the pattern being rotated/inverted vertically. Similar analysis of point P1 in view of point P2 could indicate to the system that P1 is the lower end of a roof structure. Based upon such knowledge and programmed pixel analysis techniques, the system may review nadir, oblique and street level images, search for pixel patterns having similar corresponding relationships, and based thereon identify other locations on a structure. Examples of such corresponding pixel patterns may include the pixels associated with point P5 relative to point previously determined point P3, the pixels at point P4 relative to point P2, where the pixels are point P4 are shifted both in space and orientation (rotated) with respect to the relationship between the pixels at point P1 relative to point P2, and likewise. Such analysis and recognition may be accomplished autonomously, semi-autonomously, manually and may use machine learning techniques known in the art.

As shown in FIG. 6, the system may also be configured to identify points on a structure for which the above described analysis and correlation technique cannot be reliably utilized to determine a location of a point on the structure, herein a "failure condition." It is to be appreciated, that such a failure condition may arise in view of constraints arising due to one or more internal orientation or external orientation characteristics. Failure conditions may also arise due to incomplete imagery data sets, such as may occur when one or more images needed to define a position have not been obtained, because the pixel pattern associated with such point is unique, and otherwise. It is to be appreciated that the system may be configured to predict additional points on a structure based on determined points. For example, the system may be configured to automatically predict points and determine locations thereof on a structure once a determination of the absolute location of as few as 2 points on the structure has been accomplished. The system may be configured to semi-automatically identify points, but await user input as to which of the so identified points are to be located, based on previous pixel analysis and correlations. It is also to be appreciated, that the system may be configured to predict the location of points on a structure even when imagery of the corresponding portion of such structure may not be available, is unusable, or is incomplete. For example, the system may be configured to include a prediction engine capable of predicting the location of point P6 based on the locations of one or more of points P1, P2, P3, P4, and P5. An example of where such predictions may be useful is when a portion of a structure is obscured from nadir and/or oblique image views due to interfering structures, such as other structures, foliage, geological features, or otherwise. Similarly, the system may be configured to predict a location of a point, such as point P5, based on pixel patterns available from as few as any two views, such as nadir view pattern 600 and oblique view pattern 602.

The determination of points on a structure may utilize any available images, vectors, and previously determined points. Past image captures and corresponding information, may be suitably stored in database 120 for later use by system in determining the location of one or more points on a structure. The system may be configured such that one or more variables, such as LAT/LON, address, or geocode point, may be used to determine which images, vectors and/or previously determined points are used to determine the position of any given point, including but not limited to previously determined points, on an existing structure or even a new structure.

Further, in accordance with at least one embodiment, the system may be configured to start an automatic point identification process, as discussed above, when only one determined point is available. For such an embodiment, the system may be configured to use iterative processed to predict and determine the location of one or more points based on pixel analysis and correlation techniques described above. Likewise, when a structure's center point, geo-coded location, or other identifier of the location of a structure is known, one or more imaged and predetermined points may not be needed to determine the location of any other points on a structure. Per such an embodiment, the location of one or more identified points, such points being identified per at least one embodiment of the present disclosure, may be absolutely determined based on known and/or compute distances and orientations of the known geo-coded location to the point in question.

Figure 7A:
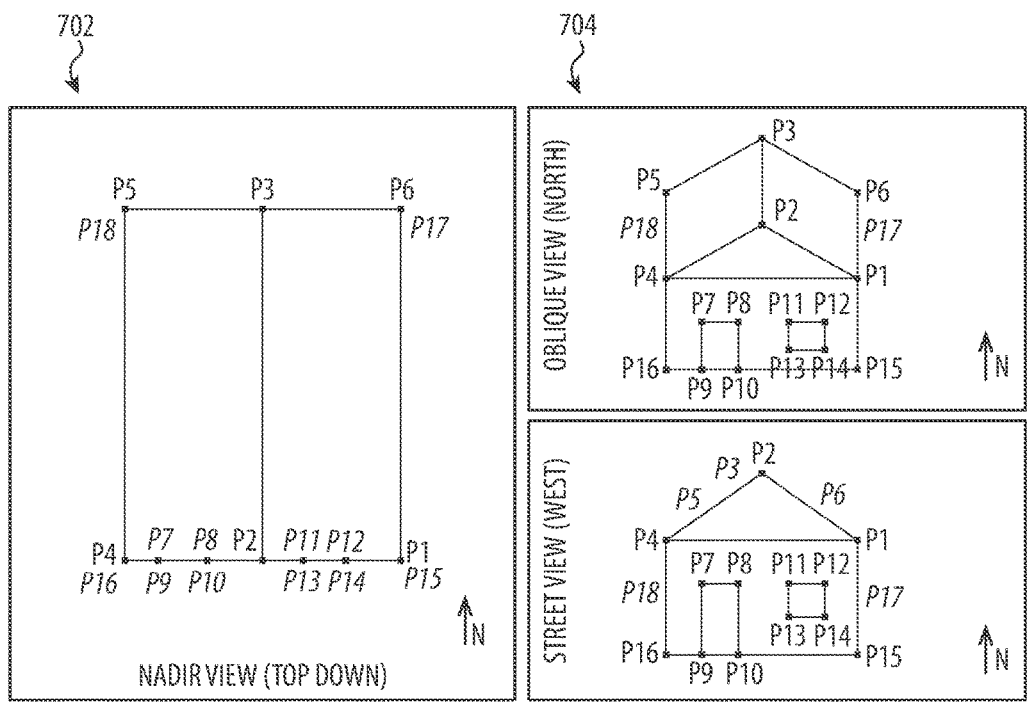
FIG. 7A illustrates a modeling of multiple points on a structure, including those viewable and hidden from view at a given vantage point, as based upon multiple images captured of the structure from one or more imaging platforms and in accordance with at least one embodiment of the present disclosure.
Figure 7B:
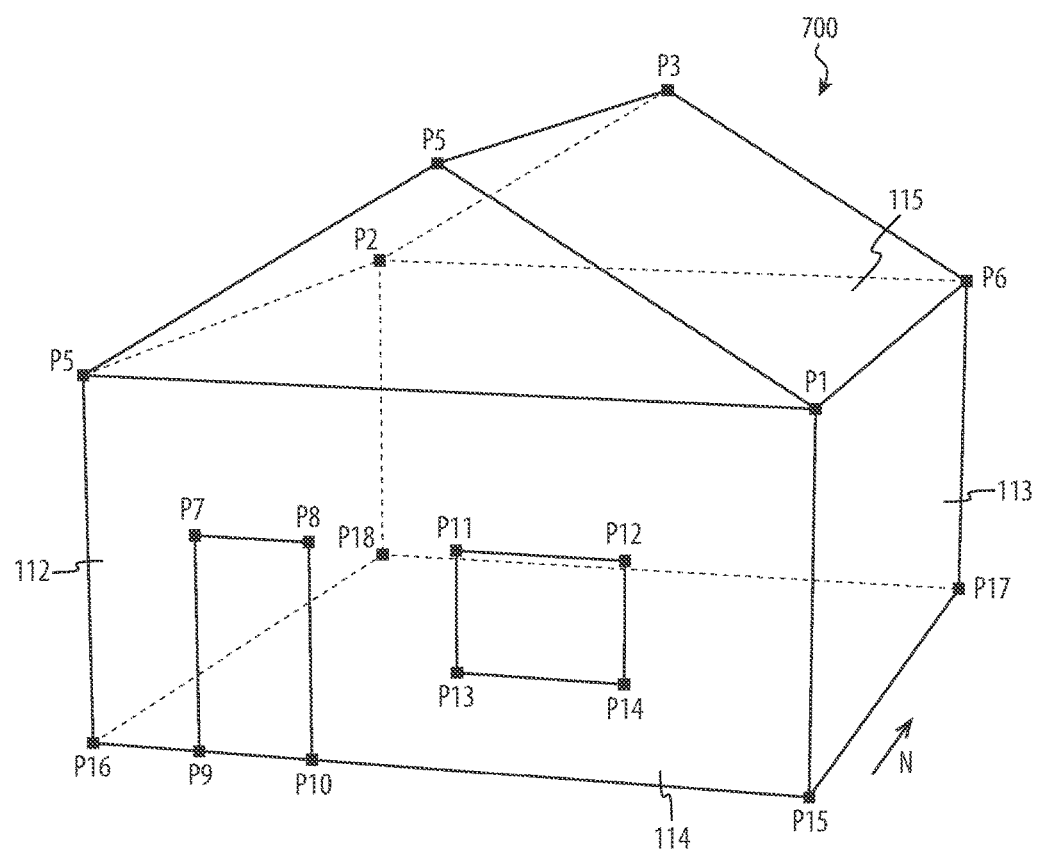
FIG. 7B illustrates a three-dimensional modeling of the structure of FIG. 7A based on the location of the points shown in FIG. 7A and in accordance with at least one embodiment of the present disclosure.

As shown in FIGS. 7A and 7B, the system may be configured to generate highly accurate models and other representations of a structure based on points determined from one or more nadir, oblique and/or street view images captured. As shown, elements of structures, such as doors and windows may be determined, where points P7-P10 define a doorway and points P11-P14 define a window in the structure. Further, points P15-P18 may also be identified, located, and used to define the ground elevations of one or more sides of the structure, such as the left-side 112, right side 113, front 114, and back 115 of structure 106 to create a three-dimensional model 700 of the structure. As shown, it is to be appreciated that one or more elements of structure 106 may not be visible in each view of the structure. For example, the door and window, as designated by points P7-P10 and P11-P14, respectively would not be present in the nadir view. Likewise, points P15-P18 would not be visible in the nadir view of the structure. In FIG. 7A, points not visible in a selected view, but visible in another view, are represented in underlined italics.

Figure 8:
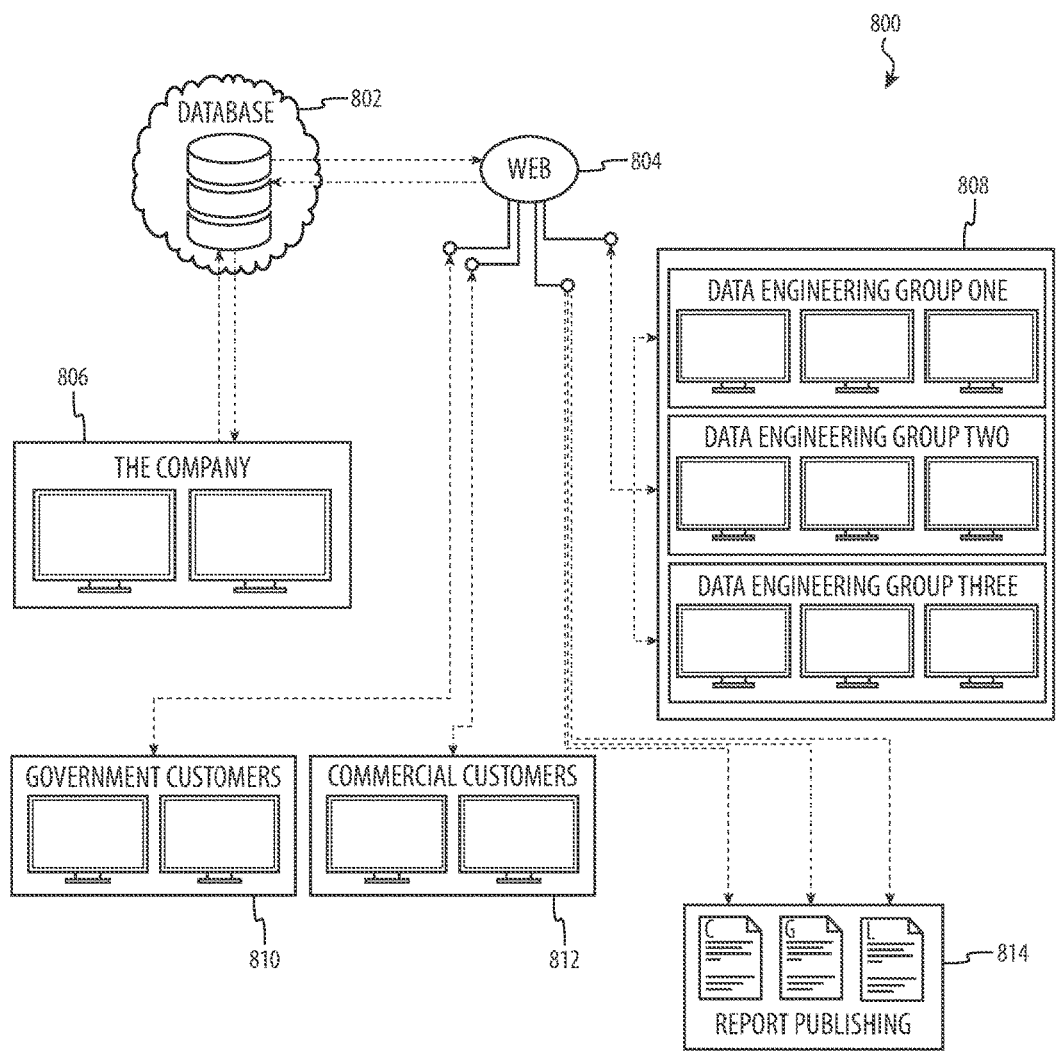
FIG. 8 is a schematic representation of a computing system configured for use in determining a location one or more points on a structure and the generating of two-dimensional and three-dimensional models of the structure based on images captured by one or more imaging platforms from two or more vantage points and in accordance with at least one embodiment of the present disclosure.

As discussed above and shown in FIG. 8, system 100 may include one or more servers 118, databases 120 and user interfaces 122 (collectively, a "computing system") that are communicatively coupled to the one or more imaging platforms 102a-102c utilized to capture one or more images of a structure 106. As shown in FIG. 8, one embodiment of such a computing system 800 may include a database 802. The database 802 may be centralized, distributed, fixed, portable, or otherwise configured. Database 802 may be configured to store images, imagery datasets, metadata about images, metadata about imaging platforms, internal orientation and external orientation characteristics, reports, user preferences and any other information desired for any implementation of any of the embodiments of the present disclosure. The configuration and use of databases 802 is well known in the art and any presently available and/or later arising database systems, architectures, protocols or otherwise may be utilized in one or more embodiments of the present disclosure.

Computing system 800 may also include one or more networking technologies 804, such as the Internet, running one or more communications protocols thereon, such as the hyper-link text transport protocol and other protocols which supports the dissemination of documents and other information across the Web. It is to be appreciated that any local, distributed, or combinations thereof network and/or interconnecting technologies, protocols, mediums or otherwise may be utilized in accordance with one or more embodiments of the present disclosure.

Computing system 800 may also include at least one processor 806, such as one used by a "company". As used herein, a reference to the "company" means a person or entity that processes one or more images captured by an imaging platform to generate location information for one or more points on a structure and/or to generate models, in two or more dimensions, of a structure or component of such structure. The company may be responsible for the capturing of images utilized to determine point locations and generate models of structures, but, need not be so. That is, the company may utilize any images, from any source to determine point locations and generate models of structures in accordance with at least one embodiment of the present disclosure. Processor 806 may include the use of any type computing devices and technologies suitable for process images per at least one embodiment of the present disclosure. For at least one embodiment, processor 806 may be provided in a networked computing system, a mainframe computer, a desktop computer, a personal computer, a tablet, or any other computing device having 1 or more processing threads executing on 1 or more cores at 2.9 ghz (speed) and capable of executing 27,000 MIPS (million instructions per second). Further, processor 806 may be configured to include one or more sets of computer code which configure the system 800 to perform one or more operations and/or sets of instructions, such as the algorithms and operations described herein, which facilitate the determination of locations of points on structures, the generation of multi-dimensional models of structures and the rendering, display and/or presentation of humanly perceivable models of structures.

Further, one or more user input/output devices may be used with computing system 800, including, but not limited to, one or more displays, such as displays provided on lap-top computers, tablets, smart-phones and other devices, virtual reality goggles, holographic displays, and other display technologies, printers such as two-dimensional and three-dimensional printers, and other information processing and/or presentation devices and technologies. The displays may be configured to present information to user in one or more frames or windows, across one more display devices. Examples of such frames being shown in the drawing figures. It is to be appreciated that the depictions shown in FIGS. 6A, 6B, 6C, 7A, 7B, 9, 10 and 11 are for illustrative purposes and are not intended to be limiting of the variety and types of information that computing system 800 may be configured to generate and present to a user thereof.

Examples of other user input/output devices that may be used with computing system 800 include, but are not limited to, keyboards, voice command and response systems, styluses, displays and otherwise. For at least one embodiment, a user input device may include a mouse having a scroll wheel and one or more buttons. The mouse user interface may include one more lines of computer code which, when executed, instruct a computing device to provide certain functionalities. For example, a movement of the mouse along the top of a surface, such as a desk-top, may result in a corresponding movement of a cursor on a visual display device for a given window then being presented, such as in window presenting the first view 200. Further, the mouse code may include instructions that enable a user to control various aspects and display presentations of the structure, such as when the mouse is used in conjunction with a window presenting the second view 202 or third view 204 to rotate the structure about a Z axis or other axis or combination of axes. As shown in FIG. 7A for at least one embodiment, multiple windows, such as first window 702, second window 704 and third window 706, may be presented to a user on one or more display devices. When presenting such multiple views, the planar motion of the mouse may be configured to control one or more of such views, while a movement of a Z wheel may be configured to control one or more other views. Similarly, the computing system 800 may be configured such that selection/depressing of one or more buttons on a mouse or other input device may provide certain functionalities. For example, the depressing of a first mouse button may result in a locked presentation of a structure with respect to a first reference system, while the depressing of another mouse button may result in the selection of point on a structure, the extraction of a location on a structure, or otherwise. Accordingly, it is to be appreciated that computing system 800 may be configured to provide any desired type of user input capabilities in view of any type of user input devices and/or technologies utilized for a given embodiment.

Computing system 800 may also be configured to generate and present, via one or more user input/output devices, one or more engineering group interfaces 808. Such interfaces 808 may be configured and/or permitted to access any desired level of information provided in database 802 to determine locations of points, model structures, and generate humanly perceptible outputs and reports regarding a structure. The permissions and capabilities provided may vary from one engineering group to another. For example, an engineering group supporting government customers may have greater permissions and their interfaces 808 may be configured, physically or virtually, to generate point locations and/or models of structures at ever higher precision, or otherwise. The engineering group interfaces 808 may include any desired combination of actual and/or virtual computing, presentation and reporting capabilities presently known and/or later arising.

Computing system 800 may also be configured to include one or more government customer interfaces 812 and/or commercial customer interfaces 814. It is to be appreciated that such interfaces 812/814 may provide any permitted level of capabilities to identify and/or render/present point locations and models of structures. Such permitted levels of capabilities may vary based on any desired factor, such as governmental regulations, resolution/accuracy permitted, type of structure (e.g., private versus government structures), location (e.g., foreign versus domestic), budget (e.g., higher resolution models costing more than lower resolution models), complexity of a structure, or otherwise (each factor being a "reporting constraint"). Accordingly, it is to be appreciated that company devices 806, database 802, and engineering group devices 810 may be configured to limit the generation of point locations and/or modeling of structures based upon one or more reporting constraints.

Computing system 800 may also be configured to include one or more reporting interfaces 814. Reporting interfaces 814 may be configured using any known or later arising technologies which can be utilized to generate one or more reports, presentations, displays, images, renderings, physical models, virtual models, or otherwise of a structure and/or one or more points thereon in view of one or more, if any, reporting constraints. One example, of such a report is shown in FIG. 9 and discussed further below.

Also, it is to be appreciated that computing system 800 may include other components, commonly known in the art, that are not depicted in FIG. 8 or otherwise discussed herein.

Figure 9:
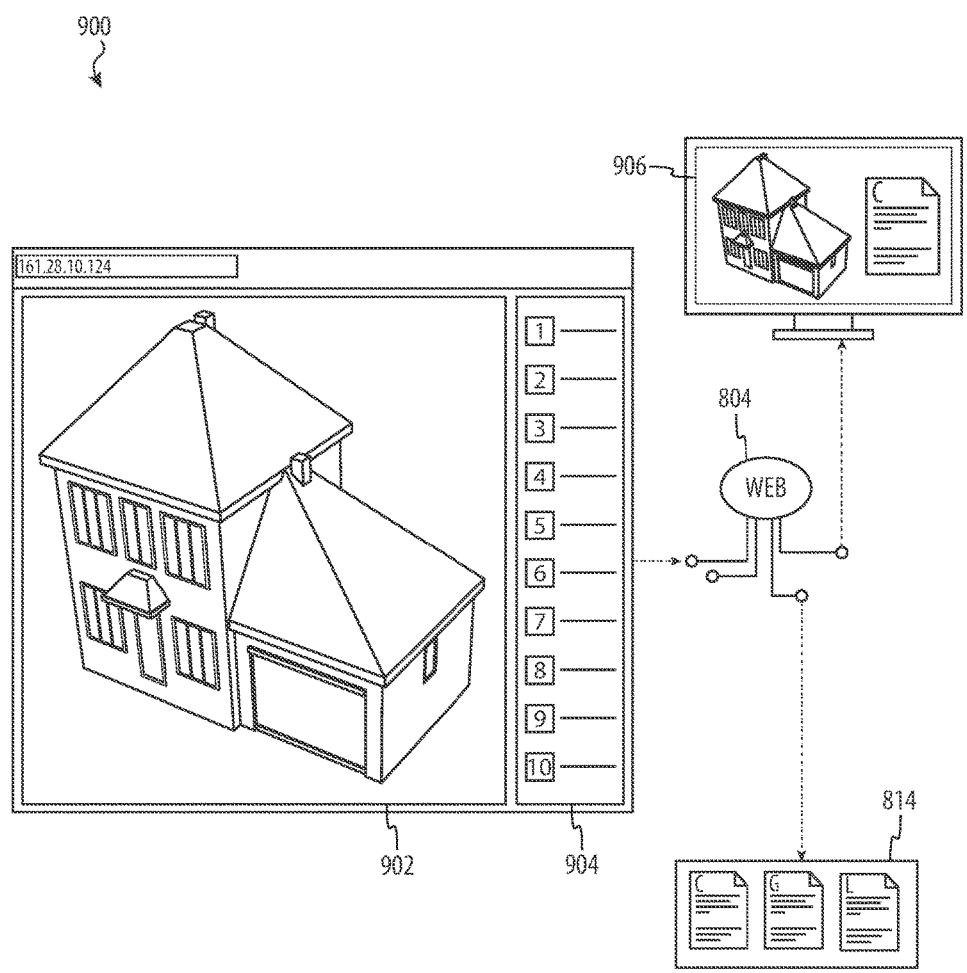
FIG. 9 illustrates one embodiment of a commercial user interface provided for use by a commercial user of one or more elements of the computing system of FIG. 8 and depicting three-dimensional models of a structure and in accordance with at least one embodiment of the present disclosure.

As shown in FIG. 9, one embodiment of a commercial interface 900 is presented. As shown, commercial interface 900 may include one or more display windows 902, wherein, for example, a virtual model of a structure may be presented. Further, commercial interface 900 may present to the commercial user one or more control options, for example, in a control options window 904. The control options may relate to how the virtual model of the structure is to be presented using a reporting interface 814 and/or as a virtual output 906. Such control options may vary by customer, job, structure, data available in an imagery dataset, or otherwise. In at least one embodiment, the control options may include the option of selecting a measuring capability of computing system 800. It is to be appreciated, that the providing and use of control windows, use input devices and otherwise may be provided, in any desired combination or permutation of user input/output features sets, to some or all of the potential users of system, as desired for any given implementation of any embodiment of the present disclosure.

Figure 10:
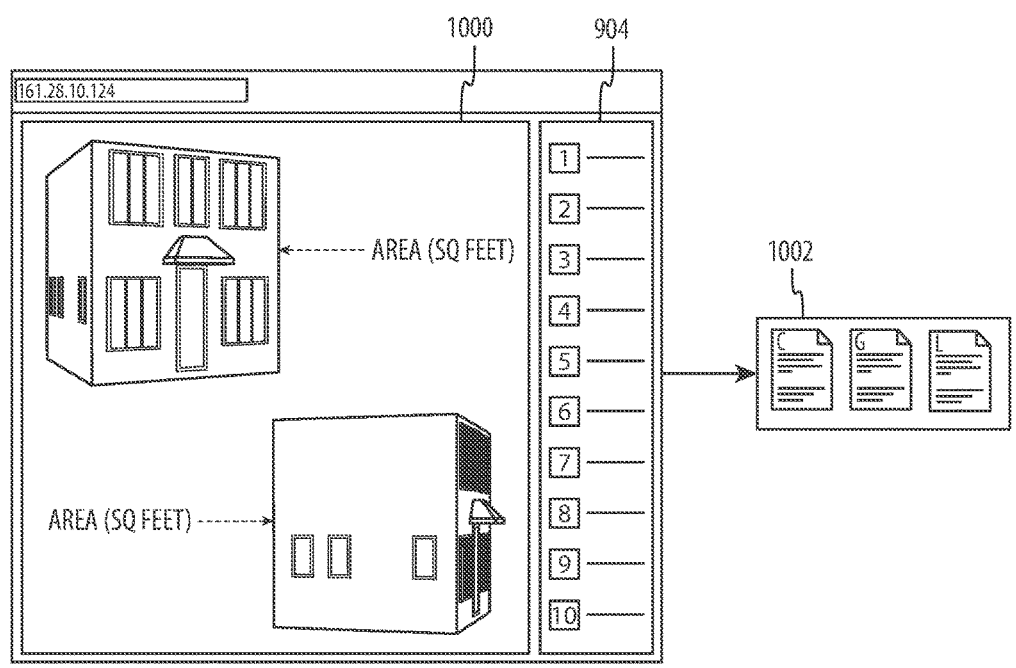
FIG. 10 illustrates one embodiment of a virtual report generated by one or more elements of the computing system of FIG. 8 based on one or more two-dimensional and/or three-dimensional models generated by the computing system and in accordance with at least one embodiment of the present disclosure.
Figure 11:
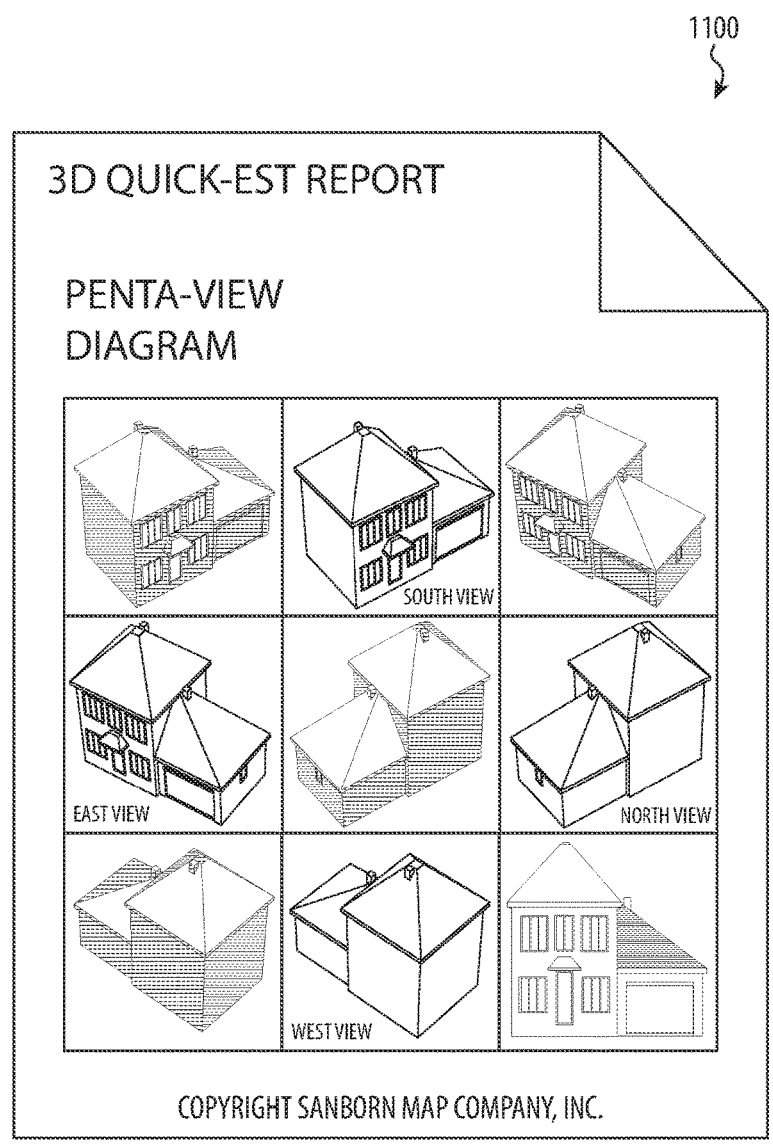
FIG. 11 illustrates an embodiment of a virtual report generated by one or more elements of the computing system of FIG. 8 based on a model of a structure generated by the computing system from two or more images captured by one or more imaging platforms located at two or more vantage points and in accordance with at least one embodiment of the present disclosure.

For example, as shown in FIG. 10, the computing system 800 may be configured to generate and present reports, such as virtual report 1000 and/or physical reports 1002, which measure the area of one or more elements of a structure. It is to be appreciated that control options window 904 may be configured for use by any device communicatively coupled to computing system 800 and may be configured to provide any desired output option features, such as measurements of lengths, slopes, sizes, areas, pitches, bulk-planes, overhangs, offsets, setbacks and any other desired calculations or determinations. Similarly, computing system 800 may be configured to generate multi-view outputs, such as the three-dimensional Quick-Est Report 1100 shown in FIG. 11. The three-dimensional Quick-Est Report is a report format authored by applicant, Sanborn Map Company, Inc. of {location} ("Sanborn"). Sanborn reserves all copyrights in the three-dimensional Quick-Est Report format. It is to be appreciated that virtual reports may be generated in any desired format, such as in computer aided design formats, or otherwise. Further, virtual reports 1000 and/or physical reports 1002 may be suitably saved in database 802 or otherwise. Further, the computing system 800 may be configured to generate any desired report by combing multiple oblique views of a structure and presenting models of the structure from multiple perspectives. For example, any individual and/or combinations of any number of south, north, west, east, nadir and other perspectives may be presented in a report.

Figure 12:
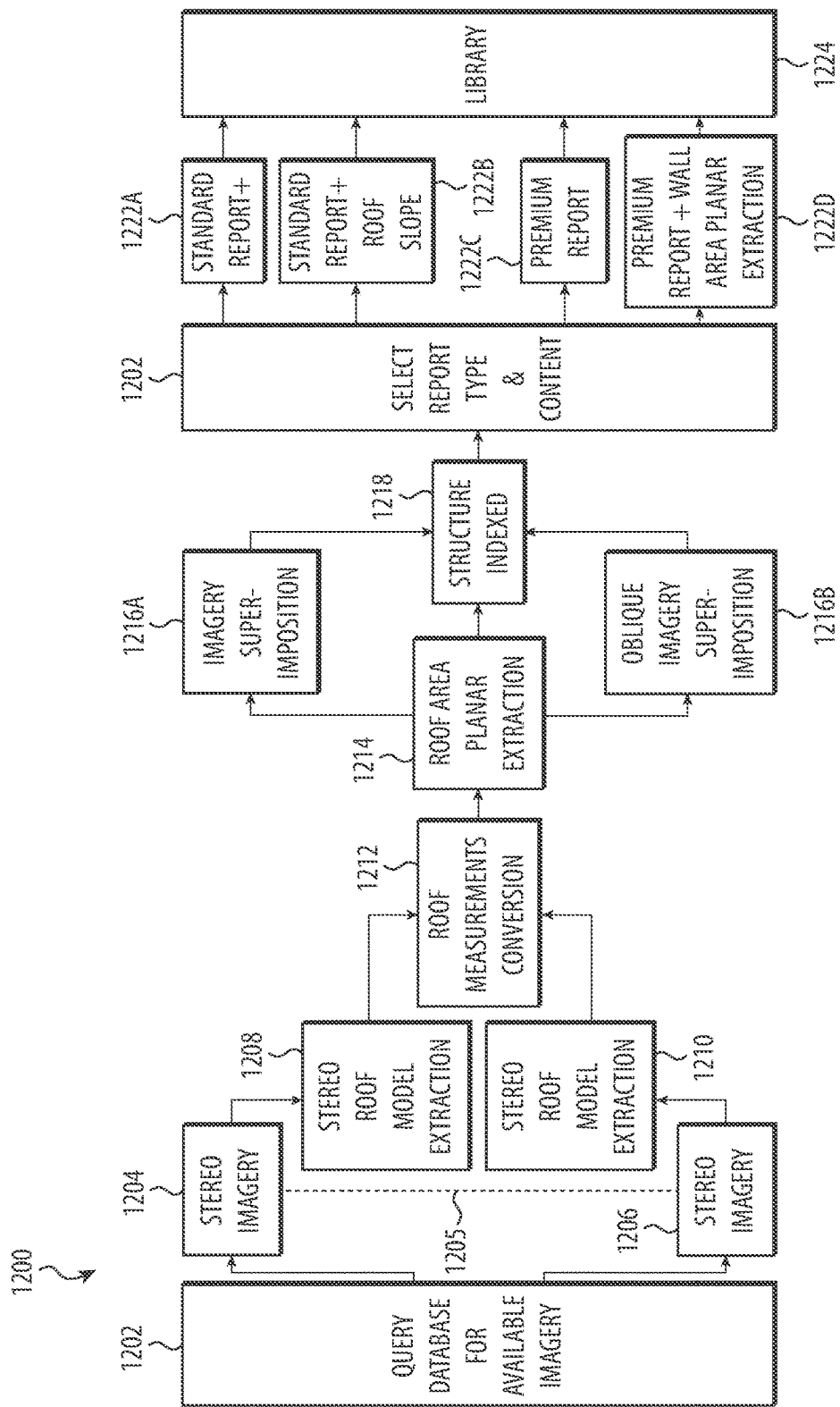
FIG. 12 is a flow diagram illustrating a process for selecting and generating one or more reports of a structure in accordance with at least one embodiment of the present disclosure.

As shown in FIG. 12, a process 1200 for selecting and generating one or more reports of a structure in accordance with at least one embodiment of the present disclosure may include querying a database, such as database 120, for available imagery, as per Operation 1202. The imagery available may be unprocessed or processed, where processed imagery is that for which the location of one or more points on a structure has been determined with high precision. If unprocessed, one or more of the operations discussed above may be utilized to process the image. An image so processed according to one or more of the embodiments of the present disclosure is herein referred to as an "optimized image" and a set of such processed images for a given structure is referred to as an "optimized imagery dataset." It is to be appreciated, as shown by Operation 1204, that an optimized image and/or an optimized imagery dataset may include images that were captured as stereo images and/or, as shown by Operation 1206, as oblique imagery. For a given implementation, either stereo imagery, oblique imagery, both types of imagery (as represented by dashed line 1205 in FIG. 12), and/or other image types may be used to generate a report.

Per Operation 1208, when stereo imagery is available, a stereo roof model extraction process may be utilized to generate a two-dimension or three-dimension model of the roof of a given structure. Similarly, and as shown by Operation 1208, an oblique roof model extraction process may be utilized to generate a two-dimension or three-dimension model of the roof of a given structure when oblique imagery is available. When both stereo imagery and oblique imagery is available, both may be used, in any desired sequence, to extract and generate a two-dimension or three-dimension model of the roof of a given structure.

Once a roof model has been generated, one or more roof measurements may be determined, as per Operation 1212. For example, since the model of the roof has been generated using points located with high precision, as per an embodiment of the present disclosure, the length and width of a roof, or section thereof may be computed from the model with high precision.

As per Operation 1214, the process may include the identification of planar areas of roofs. For example, roof sections 110a and 110b may be separately identified, and named (if desired) by their planes, such as Northern roof plane, Southeast Roof Plane, etc. Any identification and/or naming convention may be used. The area of one or more of such roof planes may be calculated from the high precision point locations previously determined in accordance with at least one embodiment of the present disclosure.

As per Operations 1216A and 1216B, each planar area for a roof of a structure may be super-imposed over the original imagery, respectively stereo or oblique, captured of the structure. In accordance with at least one embodiment, the super-imposition of a roof planar area on original oblique imagery may include the generation of a penta-view diagram, as shown, for example, in FIG. 11.

As per Operation 1218, the process may also include the indexing or other identification of each roof plane in the database 120. In accordance with at least one embodiment, a roof plane may be identified by the location of its centroid. Further, roof planes may be identified by any code desired, including but not limited to machine readable codes, such as QR codes, bar codes and otherwise, and by human readable codes, such as sequences of numbers, characters, symbols, or otherwise.

As per Operation 1220, indexed reports may be utilized to generate any one of often multiple various types of reports. As discussed above, models, images and reports associated therewith may be classified by intended recipient(s), such as government, commercial, consumer, or otherwise. Based on such classification, reports of various content, format, and otherwise may be generated, such as standard reports (as per Operation 1222A), standard reports having roof sloping information (as per Operation 1222B), premium reports (as per Operation 1222C), premium reports having wall planar extractions (as per Operation 1222D), combinations and permutations of the foregoing, and otherwise. Practically any desired information obtainable from a model of a structure may be included in report, including for example, the slope, pitch, pitch ratio of one or more roof areas, offsets of roof sections, the identification of walls and measurements thereof, sun angles over a given time period, heating and cooling loads of a structure over different times and days, and otherwise. Each or one or more of these reports may be stored in a library or other public, semi-public, private, or other database, as per Operation 1224.

It is also to be appreciated that the above description of the determining, with high precision, of the location of one or more points on a roof, the determination of one or more planes associated with the roof generation of models of such one or more roof sections, and the production of reports regarding such a structure is not limited to roofs elements. Any feature, part or aspect of a structure, including but not limited to internal and external sections, hidden and non-hidden portions, or otherwise may be modeled using one or more embodiments of the present disclosure.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose device independent of a personal computer. The above specification, examples and data provide a complete description of the structure and use of the various embodiments of the invention as defined in the claims.

Although various embodiments of the claimed invention have been described above with a certain degree of particularity, or regarding one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of certain embodiments and not limiting. Changes in detail or structure may be made without departing from the basic elements of the invention as defined in the following claims.

What is claimed is:

1. A system for determining a location of a point on a structure comprising:
   a first imaging platform, comprising:
      a first focal plane having a first sensor capable of detecting:
         a first photon reflected off a first point on a structure, along a first path towards the first imaging platform, and onto the first sensor; and
         a second photon reflected off the first point, along a second path towards the imaging platform, and onto the first sensor; and
      an image processor configured to:
         sense the first photon on the first sensor and capture a first image of the first point on the structure when the first imaging platform is at a first vantage point, the first image having a first array of one or more pixels; and sense the second photon on the first sensor and capture a second image of the first point on the structure when the first imaging platform is at a second vantage point, the second image having a second array of one or more pixels; and a computing system, comprising a processor configured to determine a position of the first point on the structure by performing computer software operations comprising:

selecting a first reference system;

identifying a subset of the first array of one or more pixels from the first image as corresponding to the first point;

determining a first vector defining the first path;

determining a second vector defining the second path; and determining the position of the first point on the structure relative to the first reference system based on the first vector and the second vector.

2. The system of claim 1, wherein:
at least one first internal operation characteristic is associated with the first imaging platform; and
the processor is configured to determine the first vector based upon the at least one first internal operation characteristic and based upon at least one first external operation characteristic.

3. The system of claim 1, wherein the first photon arises along a visible wavelength portion of the electromagnetic spectrum.

4. The system of claim 2, wherein the at least one first external operation characteristic includes a distance of the first imaging platform from the first point on the structure when the first imaging platform is located at the first vantage point.

5. The system of claim 4, wherein the at least one first external operation characteristic includes an orientation of the first imaging platform relative to the structure.

6. The system of claim 5, wherein the first vantage point provides a nadir view of the first point.

7. The system of claim 1, wherein the second vantage point provides an oblique view of the first point.

8. The system of claim 1, wherein the second vantage point provides a street view of the first point.

9. The system of claim 7, wherein the first imaging platform comprises an aerial imaging platform.

10. The system of claim 1, wherein the processor is further configured to locate the first point on the structure in a three-dimensional space by performing computer software operations comprising:

selecting a second reference system; and determining the position of the first point on the structure relative to the second reference system based on the second vector.

11. The system of claim 10, wherein:
the first reference system comprises a plane; and
the second reference system comprises an axis of rotation.

12. The system of claim 10,
wherein the first focal plane of the first imaging processor comprises a second sensor capable of detecting a third photon and a fourth photon;
wherein the third photon is reflected of the first point on the structure, along a third path towards the first imaging platform, and onto the second sensor;
wherein the fourth photon is reflected of the second point on the structure, along a fourth path towards the first imaging platform, and onto the second sensor;
wherein the first imaging processor is configured to sense the third photon on the second sensor and generate a third image; wherein the third image further identifies the first point on the structure as a third array of one or more pixels;
wherein the first imaging processor is configured to sense the fourth photon on the second sensor and generate a fourth image; wherein the fourth image further identifies the second point on the structure as a fourth array of one or more pixels; and
wherein the processor is configured correlate the first array of one or more pixels with the third array of one or more pixels; and
wherein the processor is configured to correlate the second array of one or more pixels with the fourth array of one or more pixels.

13. The system of claim 12, wherein the processor is configured to generate a model of a structure by:
correlating the first reference system with the second reference system;
selecting a coordinate system for the model;
based on results of the correlation of the first array of one or more first pixels with the one or more third pixels, identify the absolute location of the first point on the structure relative to the coordinate system;
based on results of the correlation of the second array of one or more pixels with the one or more fourth pixels, identify the absolute location of the second point on the structure relative to the coordinate system;
determine the location of the second point relative to the first point; and
generating a model of the structure by depicting the location of the second point relative to the first point in the coordinate system.

14. The system of claim 13, wherein the relationship between the first array and second array indicates opposing ends of a plane forming a side of the structure.

15. The system of claim 13,
wherein each of the operations of claim 13 are repeated with respect to one or more third points on the structure;
wherein the one or more third points on the structure are each captured on one or more fifth images, as captured by the first imaging platform at one or more third vantage points;
wherein the one or more fifth images are captured based on one more third photons being sensed by the first focal plane;
wherein the one or more fifth images represent the one or more third points on the structure as a fifth array of one or more pixels; and
wherein the processor is configured to identify the location of the one or more third points on the structure relative to at least one of the absolute location of the first point and the absolute location of the second point; and
wherein the processor is configured to generate a three-dimensional model of the structure by depicting the location of the third point relative to each of the absolute location of first point and the absolute location of the second point in the coordinate system.

16. The system of claim 15, wherein the first imaging platform captures photons in the infra-red portion of the electromagnetic spectrum.

17. The system of claim 15, wherein the first vantage point provides a nadir view of the first point and an oblique view of the second point.

18. The system of claim 17, wherein the second vantage point provides an oblique view of the first point and a nadir view of the first point.

\* \* \* \* \*